United States Patent
Hwang et al.

(10) Patent No.: US 11,917,610 B2
(45) Date of Patent: Feb. 27, 2024

(54) METHOD AND DEVICE FOR TRANSMITTING SL CHANNEL IN NR V2X

(71) Applicant: LG ELECTRONICS INC., Seoul (KR)

(72) Inventors: Daesung Hwang, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 161 days.

(21) Appl. No.: 17/593,315

(22) PCT Filed: Mar. 27, 2020

(86) PCT No.: PCT/KR2020/004195
§ 371 (c)(1),
(2) Date: Sep. 15, 2021

(87) PCT Pub. No.: WO2020/197317
PCT Pub. Date: Oct. 1, 2020

(65) Prior Publication Data
US 2022/0174694 A1    Jun. 2, 2022

(30) Foreign Application Priority Data

Mar. 28, 2019 (KR) .................. 10-2019-0036026
Mar. 29, 2019 (KR) .................. 10-2019-0037156
(Continued)

(51) Int. Cl.
*H04W 72/1263* (2023.01)
*H04J 13/00* (2011.01)
(Continued)

(52) U.S. Cl.
CPC ....... *H04W 72/1263* (2013.01); *H04J 13/004* (2013.01); *H04L 5/0051* (2013.01); *H04L 27/2613* (2013.01); *H04W 72/20* (2023.01)

(58) Field of Classification Search
CPC ... H04W 72/1263; H04W 72/20; H04W 4/40; H04J 13/004; H04J 13/0003;
(Continued)

(56) References Cited

U.S. PATENT DOCUMENTS

| | | | |
|---|---|---|---|
| 2017/0094657 A1* | 3/2017 | Yoon | H04W 72/0446 |
| 2018/0048446 A1* | 2/2018 | Jiang | H04L 5/0051 |
| 2018/0176058 A1* | 6/2018 | Kim | H04L 27/2675 |

FOREIGN PATENT DOCUMENTS

| | | |
|---|---|---|
| KR | 20170053436 | 5/2017 |
| KR | 20180122879 | 11/2018 |

(Continued)

OTHER PUBLICATIONS

PCT International Application No. PCT/KR2020/004195, International Search Report dated Jul. 2, 2020, 4 pages.

*Primary Examiner* — Rina C Pancholi
(74) *Attorney, Agent, or Firm* — LEE, HONG, DEGERMAN, KANG & WAIMEY

(57) ABSTRACT

Provided are a method for a first device to perform wireless communication, and a device supporting same. The method may comprise: a step for generating a physical sidelink control channel (PSCCH) demodulation reference signal (DMRS) sequence; a step for applying an orthogonal cover code (OCC) to the PSCCH DMRS sequence and mapping the OCC on a PSCCH resource; and a step for transmitting the PSCCH DMRS sequence to a second device.

19 Claims, 45 Drawing Sheets

(30) Foreign Application Priority Data

Jul. 25, 2019 (KR) .......................... 10-2019-0090019
Jan. 22, 2020 (KR) .......................... 10-2020-0008657

(51) Int. Cl.
*H04L 5/00* (2006.01)
*H04L 27/26* (2006.01)
*H04W 72/20* (2023.01)

(58) Field of Classification Search
CPC . H04L 5/0051; H04L 27/2613; H04L 5/0007;
H04L 5/0021; H04L 27/26035
See application file for complete search history.

(56) References Cited

FOREIGN PATENT DOCUMENTS

| WO | 2016204590 | 12/2016 | | |
|----|-----------|---------|---|---|
| WO | WO-2016204590 A1 * | 12/2016 | ......... | H04L 27/2613 |
| WO | 2017178993 | 10/2017 | | |

* cited by examiner

FIG. 4
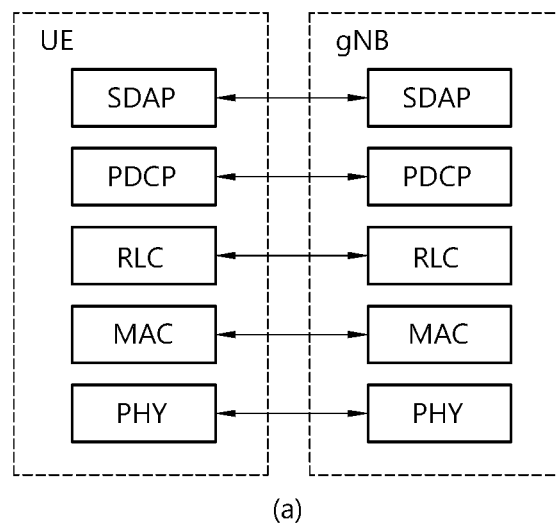
(a)
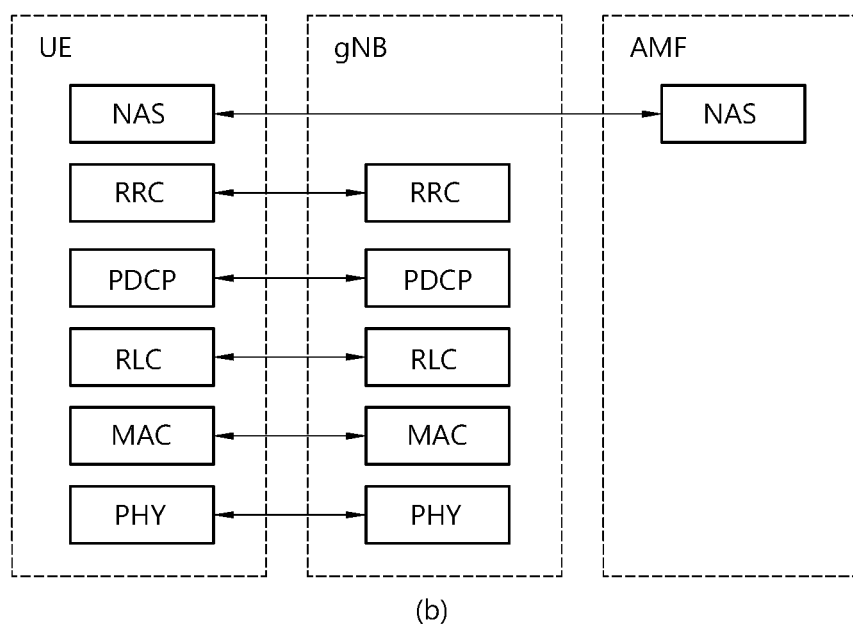
(b)

FIG. 8
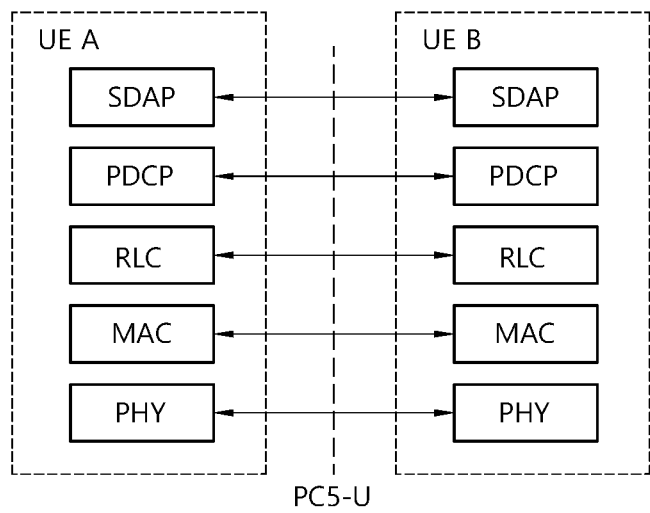
(a)
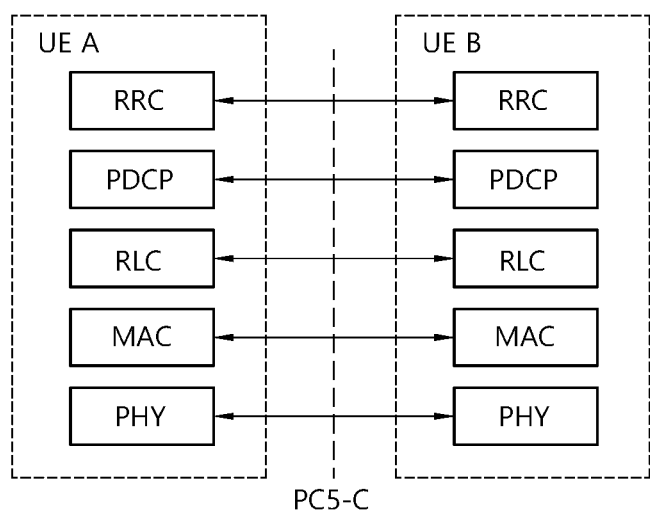
(b)

FIG. 39 receive, from first device, PSCCH DMRS sequence — S3910

METHOD AND DEVICE FOR TRANSMITTING SL CHANNEL IN NR V2X

CROSS-REFERENCE TO RELATED APPLICATIONS

This application is the National Stage filing under 35 U.S.C. 371 of International Application No. PCT/KR2020/004195, filed on Mar. 27, 2020, which claims the benefit of earlier filing date and right of priority to Korean Application Nos. 10-2019-0036026, filed on Mar. 28, 2019, 10-2019-0037156, filed on Mar. 29, 2019, 10-2019-0090019, filed on Jul. 25, 2019, and 10-2020-0008657, filed on Jan. 22, 2020, the contents of which are all hereby incorporated by reference herein in their entireties.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in order to support efficient SL communication in the next communication system, a method for determining resource(s) for a PSCCH or a PSSCH and an apparatus supporting the same need to be proposed. In addition, a method for transmitting a PSCCH based on an aggregation level and an apparatus supporting the same need to be proposed. In addition, a method for determining resource(s) for PSCCH demodulation reference signal(s) (DMRS(s)) and an apparatus supporting the same need to be proposed.

Technical Solutions

In one embodiment, a method for performing wireless communication by a first device is provided. The method may comprise: generating a physical sidelink control channel (PSCCH) demodulation reference signal (DMRS) sequence; mapping the PSCCH DMRS sequence, by applying an orthogonal cover code (OCC), on a PSCCH resource; and transmitting, to a second device, the PSCCH DMRS sequence.

In one embodiment, a first device configured to perform wireless communication is provided. The first device may comprise: one or more memories storing instructions; one or more transceivers; and one or more processors connected to the one or more memories and the one or more transceivers. For example, the one or more processors may execute the instructions to: generate a physical sidelink control channel (PSCCH) demodulation reference signal (DMRS) sequence; map the PSCCH DMRS sequence, by applying an orthogonal cover code (OCC), on a PSCCH resource; and transmit, to a second device, the PSCCH DMRS sequence.

Effects of the Disclosure

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

FIG. 39 shows a method for a second device to perform wireless communication, based on an embodiment of the present disclosure.

DESCRIPTION OF EXEMPLARY EMBODIMENTS

Figure 1:
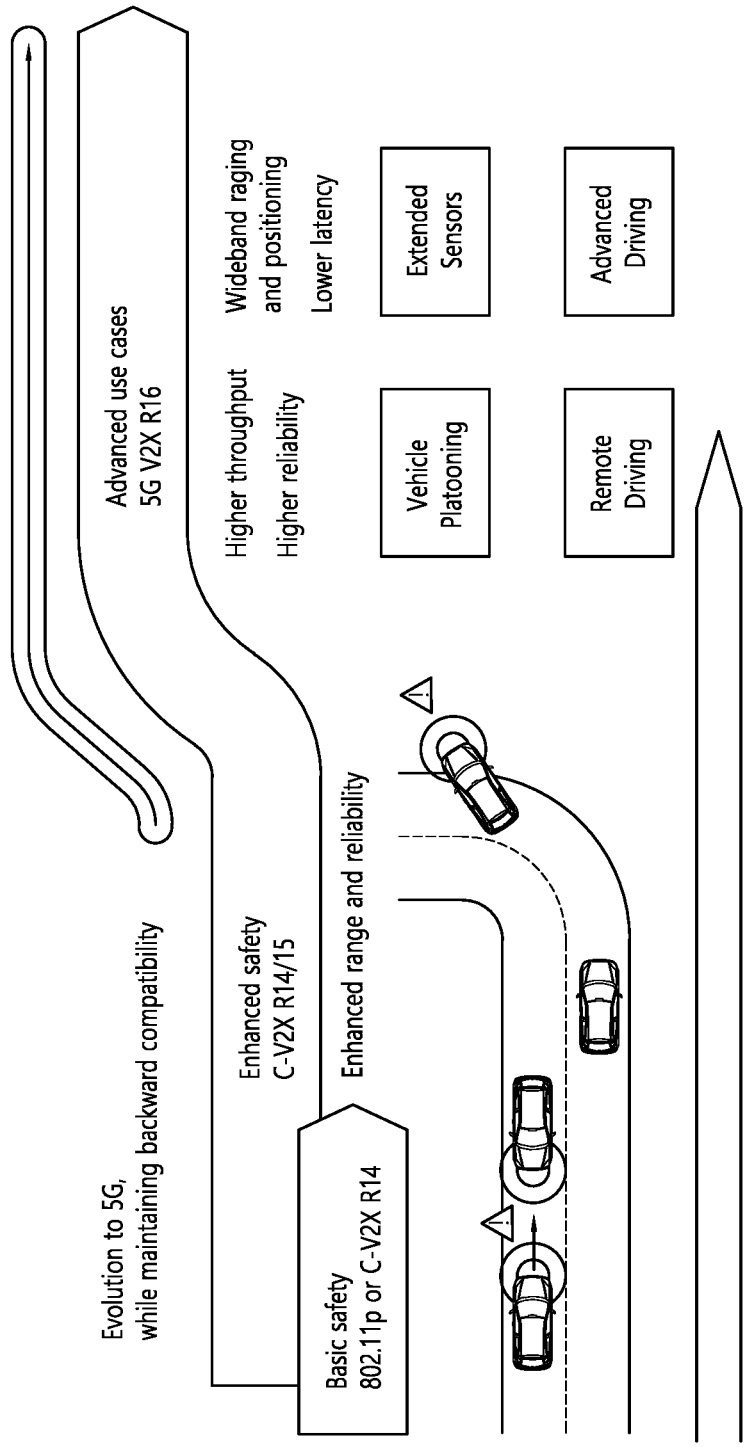
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and pro-
vides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
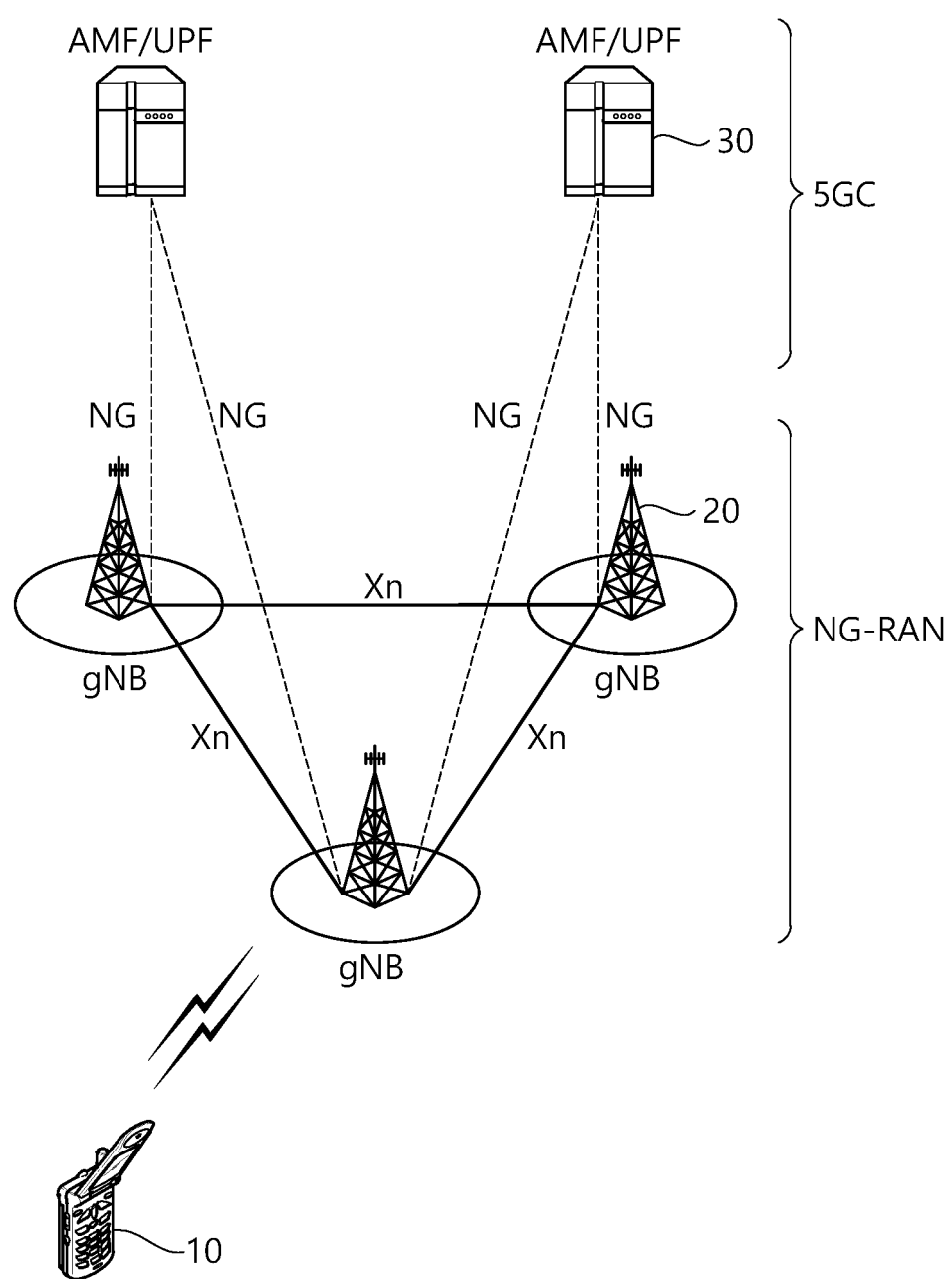
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
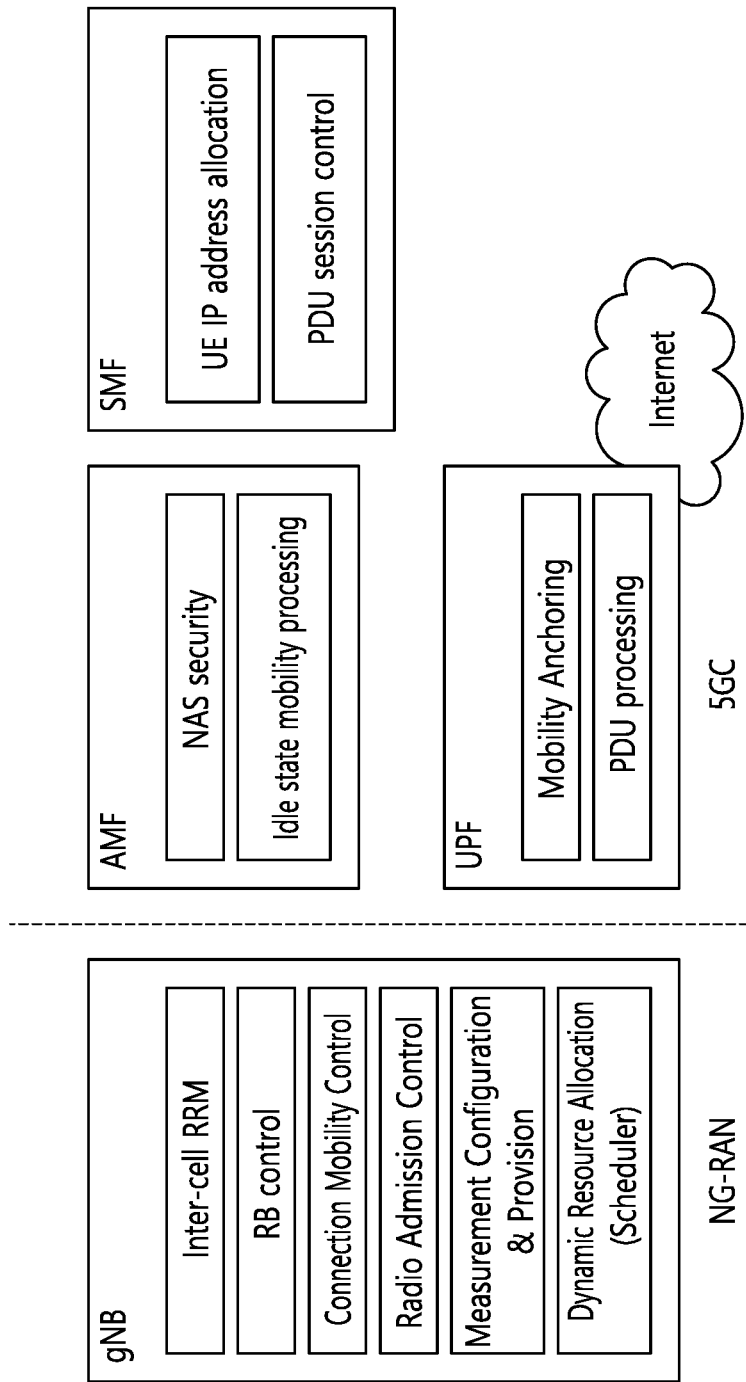
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
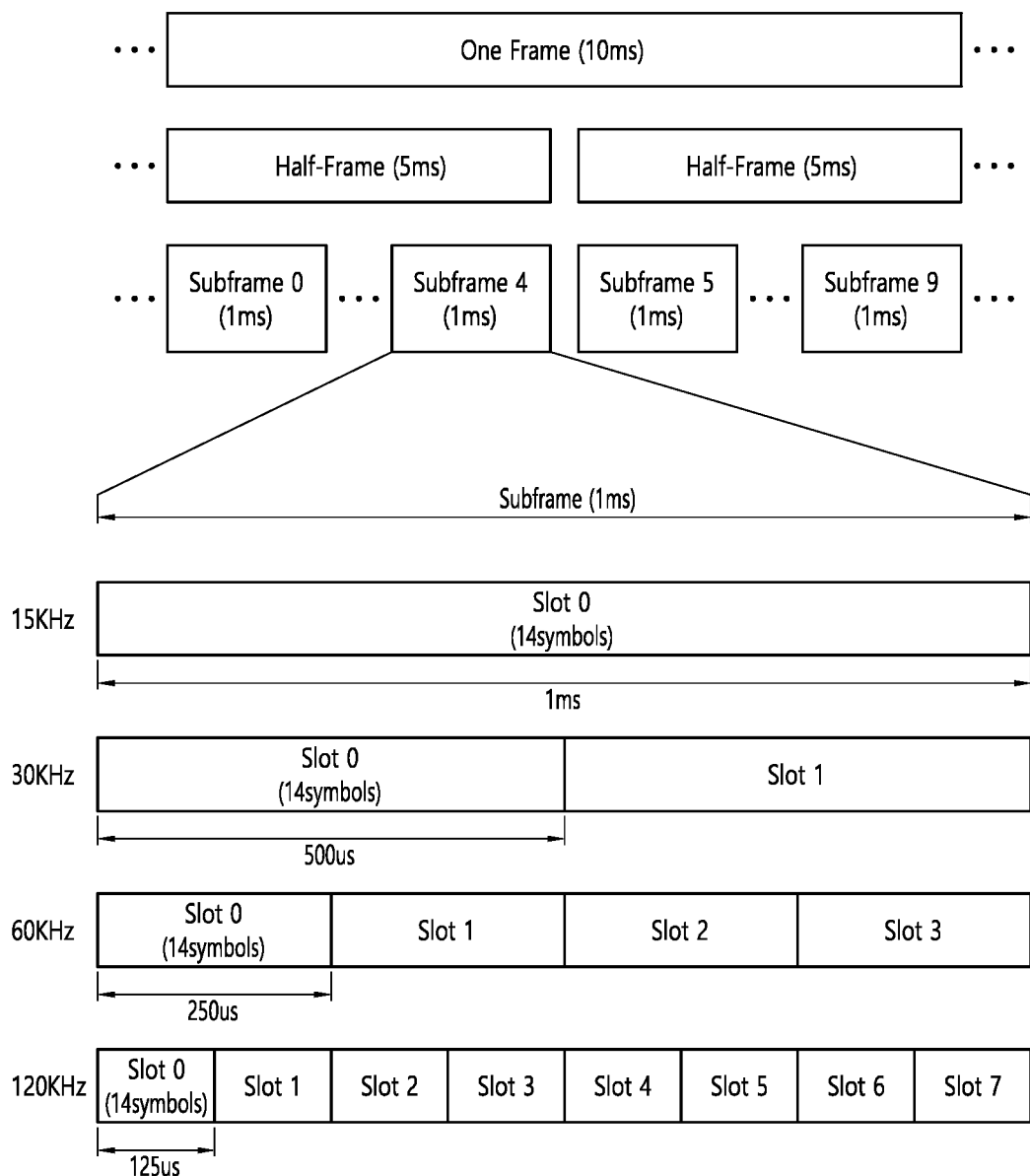
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15*2$^u$) | N$^{slot}_{symb}$ | N$^{frame,u}_{slot}$ | N$^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*2$^u$) | N$^{slot}_{symb}$ | N$^{frame,u}_{slot}$ | N$^{subframe,u}_{slot}$ |
|---|---|---|---|
| 60 KHz (u = 2) | 12 | 40 | 4 |

In an INK system, OFDM(A) numerologies (e.g., SUS, UP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
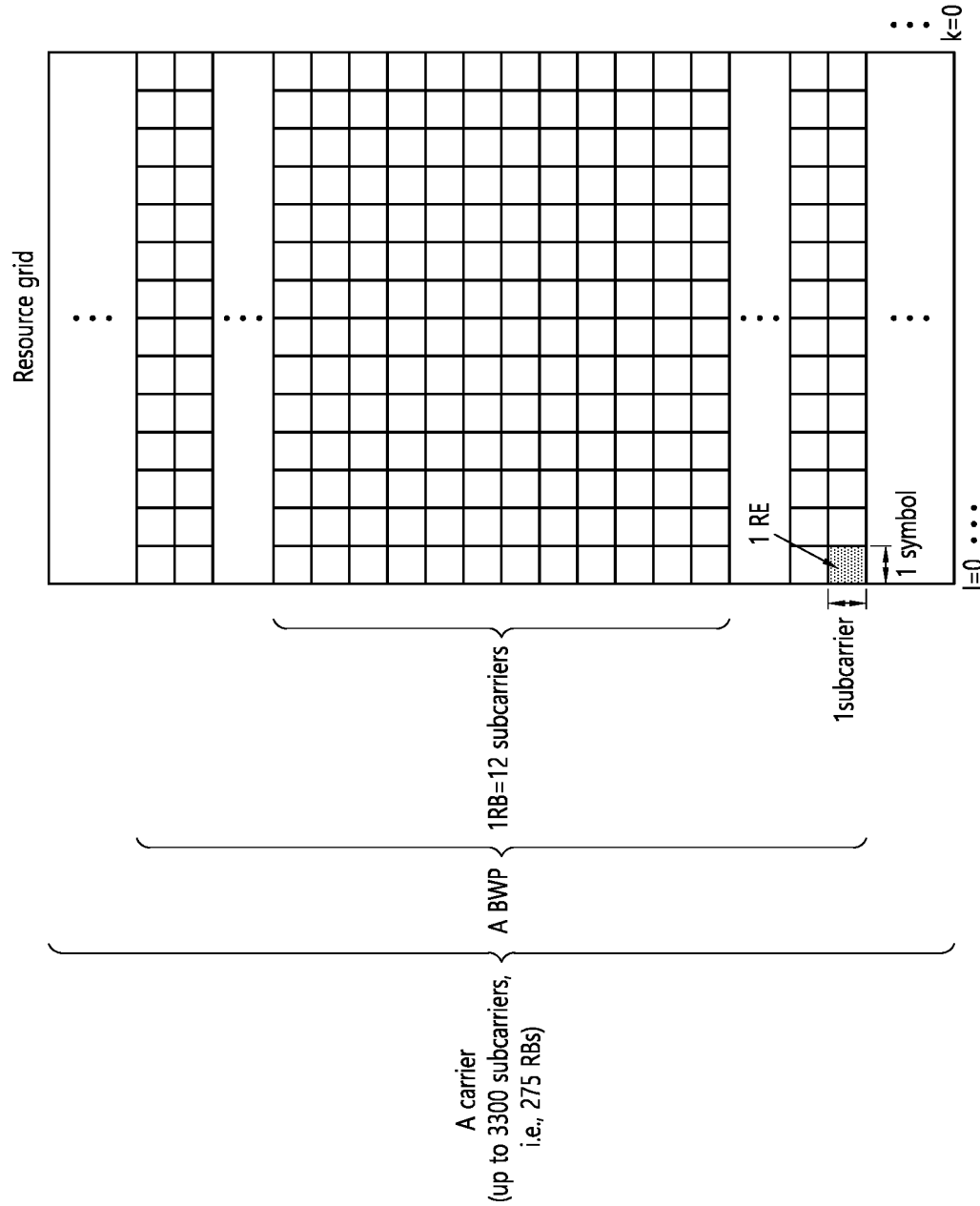
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
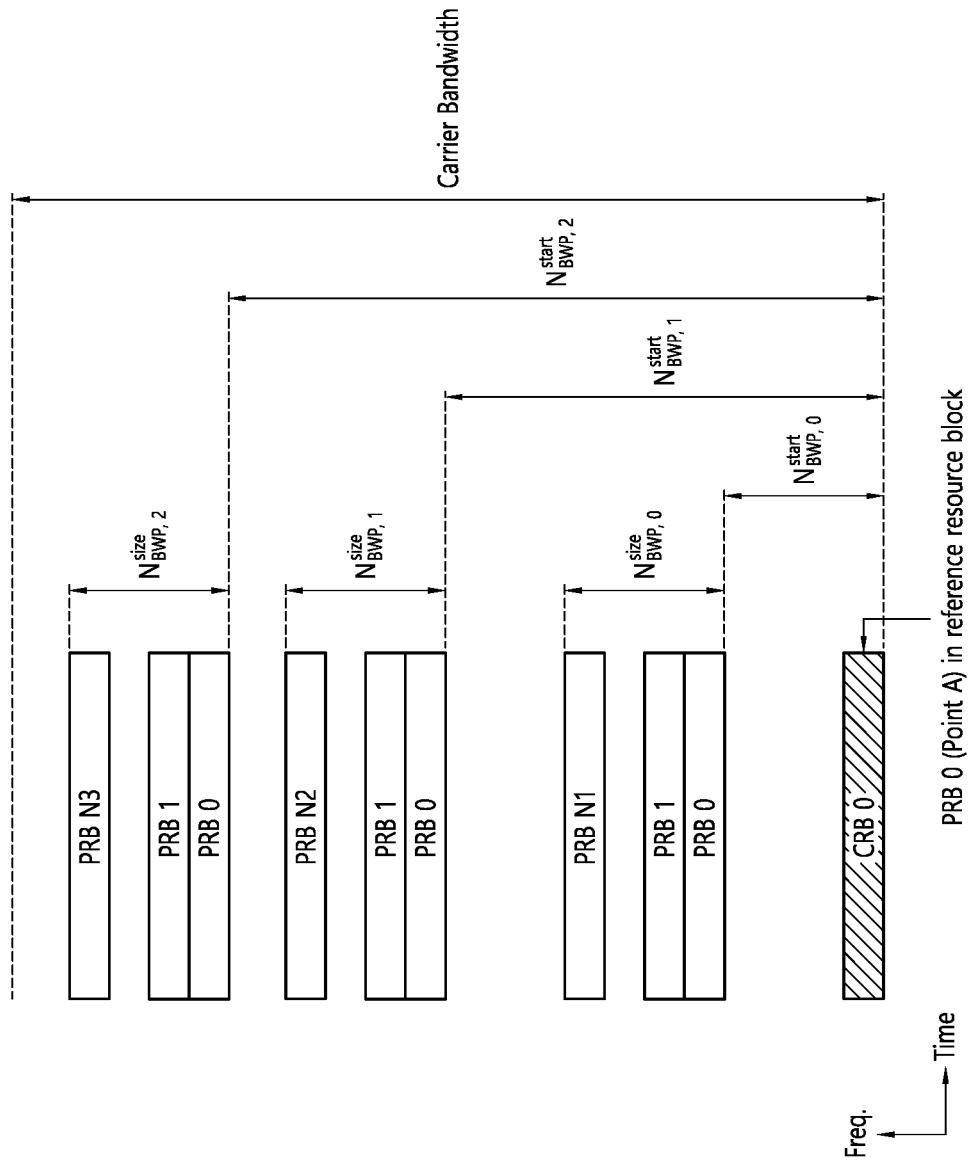
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
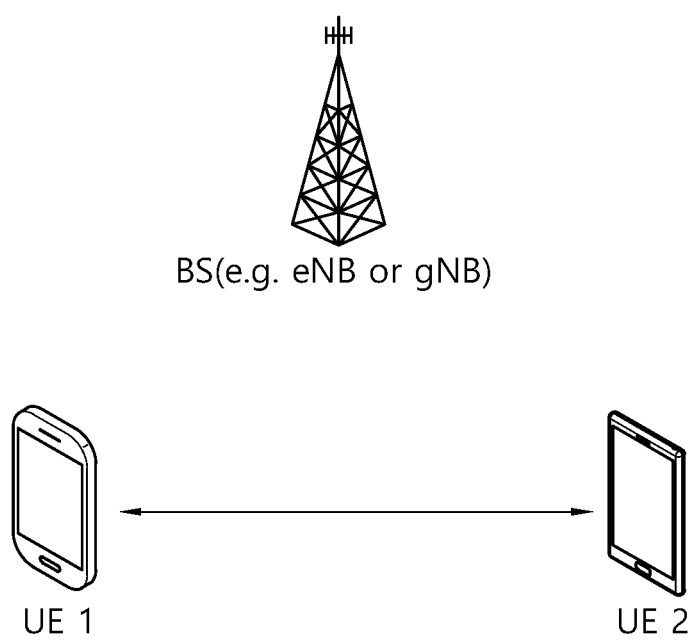
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
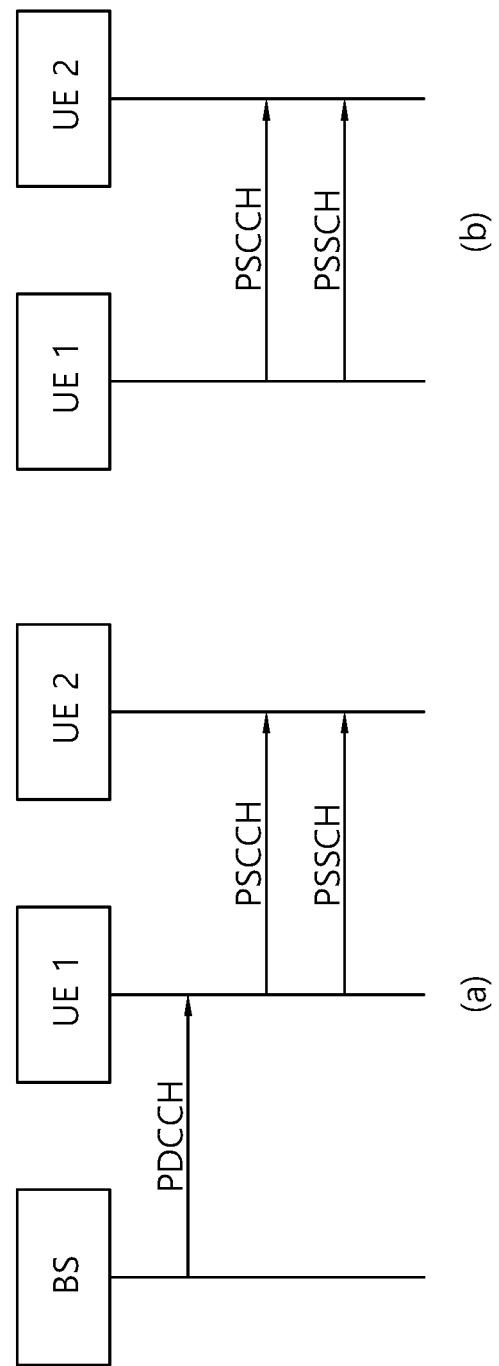
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
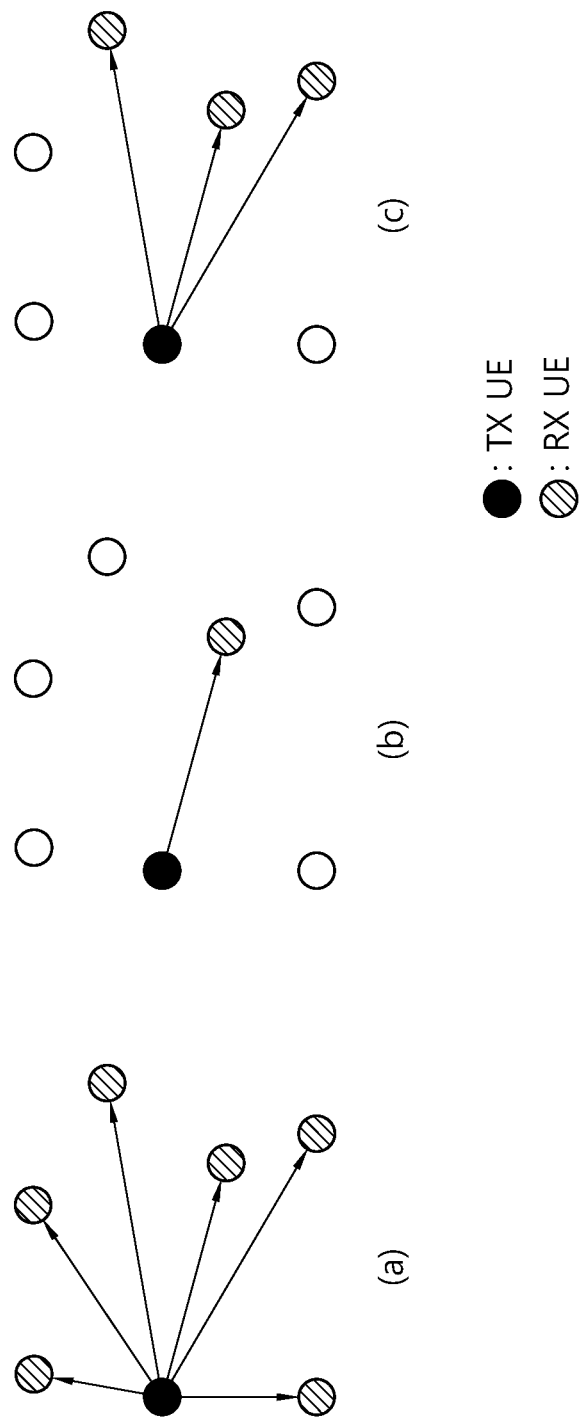
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in order to increase usage efficiency of resources for data, a form in which resources for PSCCH are confined in resources for PSSCH or a form in which resources for PSCCH are surrounded by resources for PSSCH may be supported in the next communication system.

Figure 12:
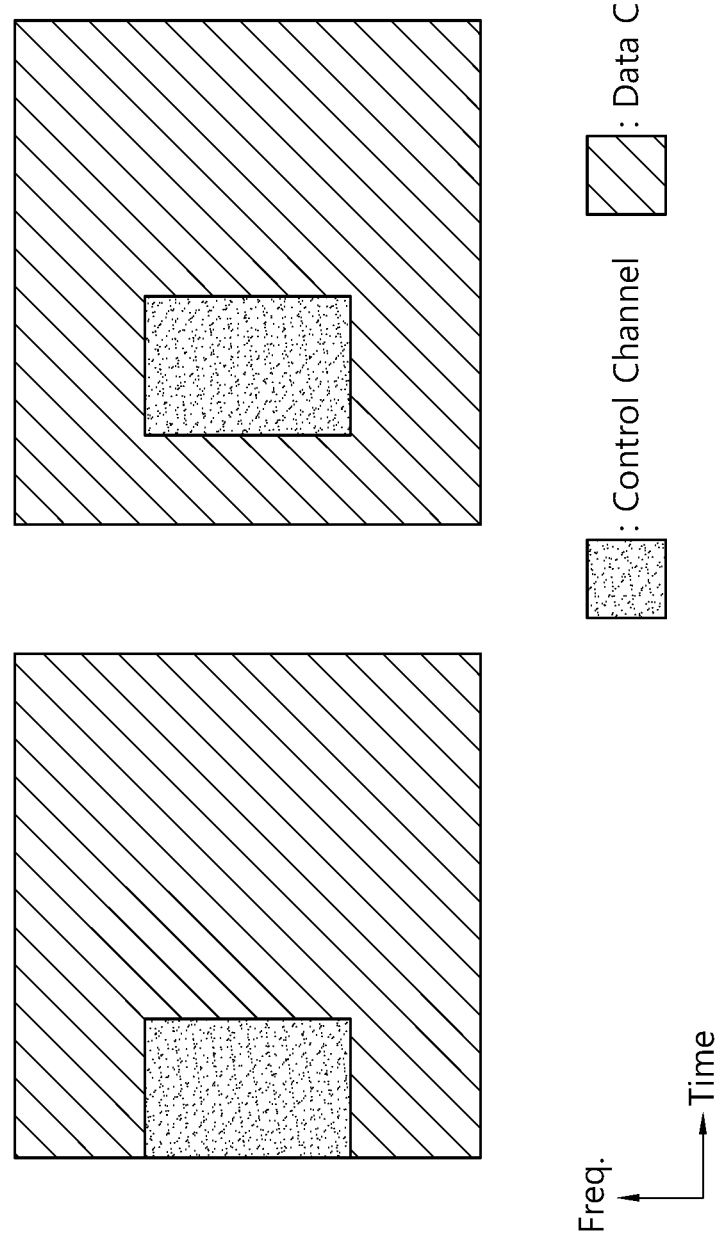
FIG. 12 shows an example of resource allocation for a data channel or a control channel, based on an embodiment of the present disclosure.

FIG. 12 shows an example of resource allocation for a data channel or a control channel, based on an embodiment of the present disclosure. The embodiment of FIG. 12 may be combined with various embodiments of the present disclosure.

Referring to FIG. 12, resource(s) for a control channel (e.g., PSCCH) may be allocated in a form confined in resource(s) for a data channel (e.g., PSSCH). Alternatively, resource(s) for a control channel (e.g., PSCCH) may be allocated in a form surrounded by resource(s) for a data channel (e.g., PSSCH).

Based on an embodiment of the present disclosure, resource allocation for a PSSCH may be performed in units of at least sub-channels. The sub-channel may include one resource block (RB) or a plurality of RBs. The sub-channel may be a channel used as a basic unit of sensing when allocating resources based on a sensing operation. If the size of the sub-channel is small, the size of bits of SCI fields for allocating resource(s) for a PSSCH may be increased, but scheduling flexibility may be increased. For example, if the size of the sub-channel is small, resource allocation of various combinations may be possible in case a plurality of UEs operate in the same resource pool. On the other hand, if the size of the sub-channel is large, the size of bits of SCI fields for allocating resource(s) for a PSSCH may be decreased, but scheduling flexibility may be decreased. For example, if the size of the sub-channel is large, a combination of a start location of a frequency to which a PSSCH can be mapped and a possible resource allocation may be limited.

Considering latency requirements, a PSCCH may be located at the beginning of a slot. For example, a PSCCH may be transmitted by being mapped from a start symbol of a slot. In addition, a PSCCH may be transmitted across some symbols. For example, a PSCCH may be transmitted across one or more consecutive symbols. In this case, in consideration of the payload size of a SCI transmitted through a PSCCH, in order to ensure sufficient detection performance and/or coverage, the amount of frequency resources (e.g., RBs) through which the PSCCH is transmitted may be inversely proportional to the number of symbols through which the PSCCH is transmitted. For example, if the number of symbols for a PSCCH is 4, the PSCCH may need to be transmitted through 10 RBs or 8 RBs. For example, depending on the SCI payload size, the number of required RBs may be greater than that of the above example, or the number of required RBs may be relatively smaller than that of the above example.

Meanwhile, in order to support efficient SL communication in the next communication system, a method for determining resource(s) for a PSCCH or a PSSCH and an apparatus supporting the same need to be proposed. In addition, a method for transmitting a PSCCH based on an aggregation level and an apparatus supporting the same need to be proposed. In addition, a method for determining resource(s) for PSCCH demodulation reference signal(s)

(DMRS(s))) and an apparatus supporting the same need to be proposed. In the present disclosure, resource(s) for a PSCCH may be resource(s) for transmitting a PSCCH. In the present disclosure, PSCCH DMRS(s) may refer to reference signal(s) for decoding a PSCCH.

Hereinafter, based on an embodiment of the present disclosure, a method for determining resource(s) for a PSCCH or a PSSCH and an apparatus supporting the same will be described.

Figure 13:
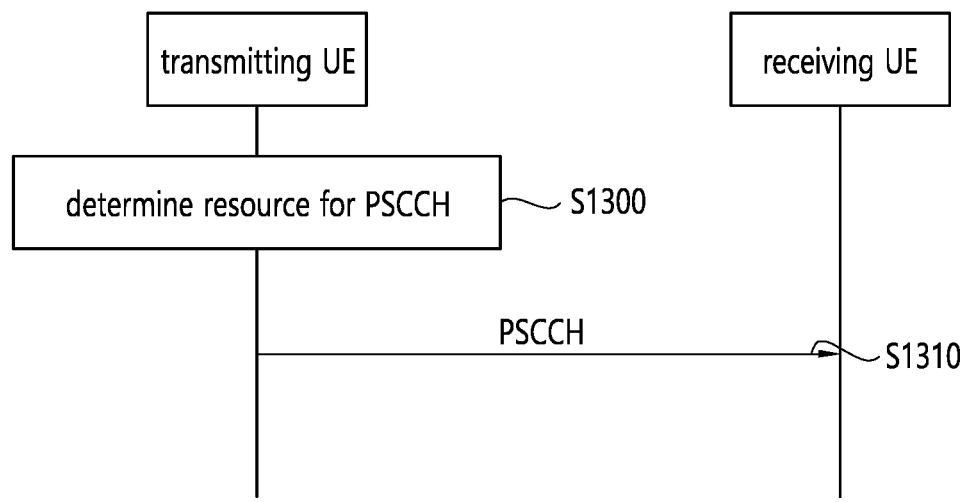
FIG. 13 shows a procedure for a transmitting UE to transmit a PSCCH on resource(s) for the PSCCH, based on an embodiment of the present disclosure.

FIG. 13 shows a procedure for a transmitting UE to transmit a PSCCH on resource(s) for the PSCCH, based on an embodiment of the present disclosure. The embodiment of FIG. 13 may be combined with various embodiments of the present disclosure.

Referring to FIG. 13, in step S1300, a UE may determine resource(s) for a PSCCH. Specifically, in step S1300, resource(s) for the PSCCH may be configured in one sub-channel.

If resource(s) for the PSCCH is configured in one sub-channel, the UE may (implicitly) derive PSCCH resource(s) based on the number of RBs included in a sub-channel. For example, if a sub-channel is (pre-)configured for the UE, the UE may (implicitly) determine PSCCH resource(s) based on the number of RBs included in the sub-channel. For example, if a sub-channel is indicated to the UE through a PSBCH, the UE may (implicitly) determine PSCCH resource(s) based on the number of RBs included in the sub-channel. For example, if the size of the sub-channel is 10 RB, 10 RB may be allocated for the PSCCH. For example, if the size of the sub-channel is 10 RB, 8 RB may be allocated for the PSCCH in consideration of an upper guard RB and a lower guard RB. Furthermore, the number of symbols (hereinafter, referred to as symbol period (value)) for the PSCCH may also be autonomously or automatically configured by the UE. Specifically, for example, in a state in which the number of RBs for the PSCCH is configured to the size of the sub-channel, the UE may automatically determine or derive the symbol period (value) for the PSCCH so that the number of REs for the PSCCH can be secured to be equal to or greater than a pre-defined threshold. For example, the UE may automatically determine or derive the symbol period (value) for the PSCCH so that the number of REs for the PSCCH can be secured to be equal to or greater than a threshold (pre-)configured for each resource pool. For example, the UE may automatically determine or derive the symbol period (value) for the PSCCH so that the number of REs for the PSCCH can be secured to be equal to or greater than a threshold value (pre-)configured for each SCI format. More specifically, DMRS(s) for the PSCCH may be excluded from the number of REs. If the threshold value is expressed as N, the above method may be expressed by Equation 1 or Equation 2. For example, the UE may calculate or obtain the symbol period (value) for the PSCCH based on Equation 1 or Equation 2.

$$PSCCH\ symbol\ period = \left\lceil \frac{N}{\text{the number of subcarriers for each } RB \times \text{the number of } PSCCH\ RBs} \right\rceil \quad [\text{Equation 1}]$$

$$PSCCH\ symbol\ period = \left\lceil \frac{N}{(\text{the number of subcarriers for each } RB - \text{the number of } PSCCH\ DMRS\ REs\ \text{for each } RB) \times \text{the number of } PSCCH\ RBs} \right\rceil \quad [\text{Equation 2}]$$

For example, in a state in which the number of RBs for the PSCCH is configured to the size of the sub-channel, the UE may automatically determine or derive the symbol period (value) for the PSCCH so that a coding rate can be secured equal to or less than a pre-defined threshold. For example, the UE may automatically determine or derive the symbol period (value) for the PSCCH so that a coding rate can be secured equal to or less than a threshold value (pre-)configured for each resource pool. For example, the UE may automatically determine or derive the symbol period (value) for the PSCCH so that a coding rate can be secured equal to or less than a threshold value (pre-)configured for each SCI format. If the coding rate is denoted by R and the size of the SCI format is denoted by S, the above scheme may be expressed by Equation 3 or Equation 4. For example, the UE may calculate or obtain the symbol period (value) for the PSCCH based on Equation 3 or Equation 4.

$$PSCCH\ symbol\ period = \left\lceil \frac{S}{R \times \text{the number of subcarriers for each } RB \times \text{the number of } PSCCH\ RBs} \right\rceil \quad [\text{Equation 3}]$$

$$PSCCH\ symbol\ period = \left\lceil \frac{S}{R \times (\text{the number of subcarriers for each } RB - \text{the number of } PSCCH\ DMRS\ REs\ \text{for each } RB) \times \text{the number of } PSCCH\ RBs} \right\rceil \quad [\text{Equation 4}]$$

Alternatively, the symbol period for the PSCCH may be (pre-)configured for the UE. Alternatively, the symbol period for the PSCCH may be indicated or informed to the UE through a PSBCH.

Alternatively, if resource(s) for the PSCCH is configured in one sub-channel, the UE may receive configuration for frequency resource(s) and/or a symbol period for the PSCCH from a base station. The configuration for the frequency resource(s) and/or the symbol period for the PSCCH may be (pre-)configured for the UE. Alternatively, the configuration for the frequency resource(s) and/or the symbol period for the PSCCH may be transmitted to the UE through a PSBCH indication. In this case, the UE may not expect that indicated and/or configured RB allocation of the PSCCH is larger than the size of the sub-channel. For example, the UE may determine that indicated and/or configured RB allocation of the PSCCH is smaller than or equal to the size of the sub-channel.

Figure 14:
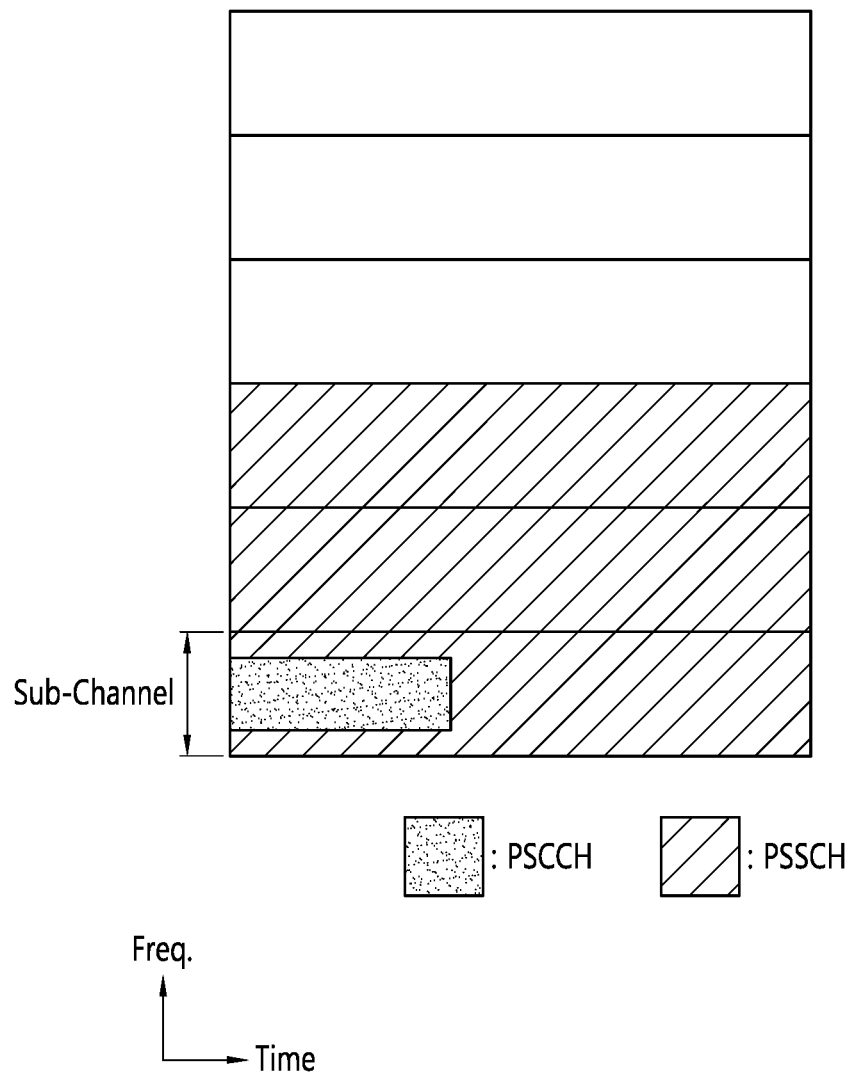
FIGS. 14 to 16 show various examples in which a PSCCH is confined in one sub-channel, based on an embodiment of the present disclosure.
Figure 15:
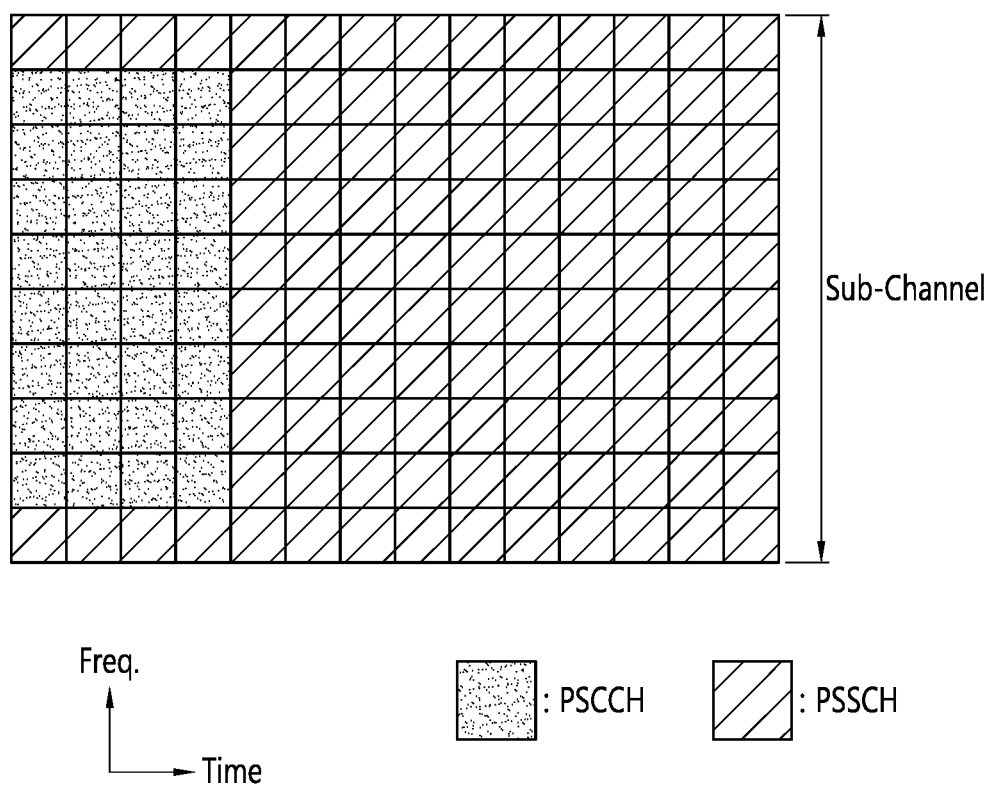
Figure 16:
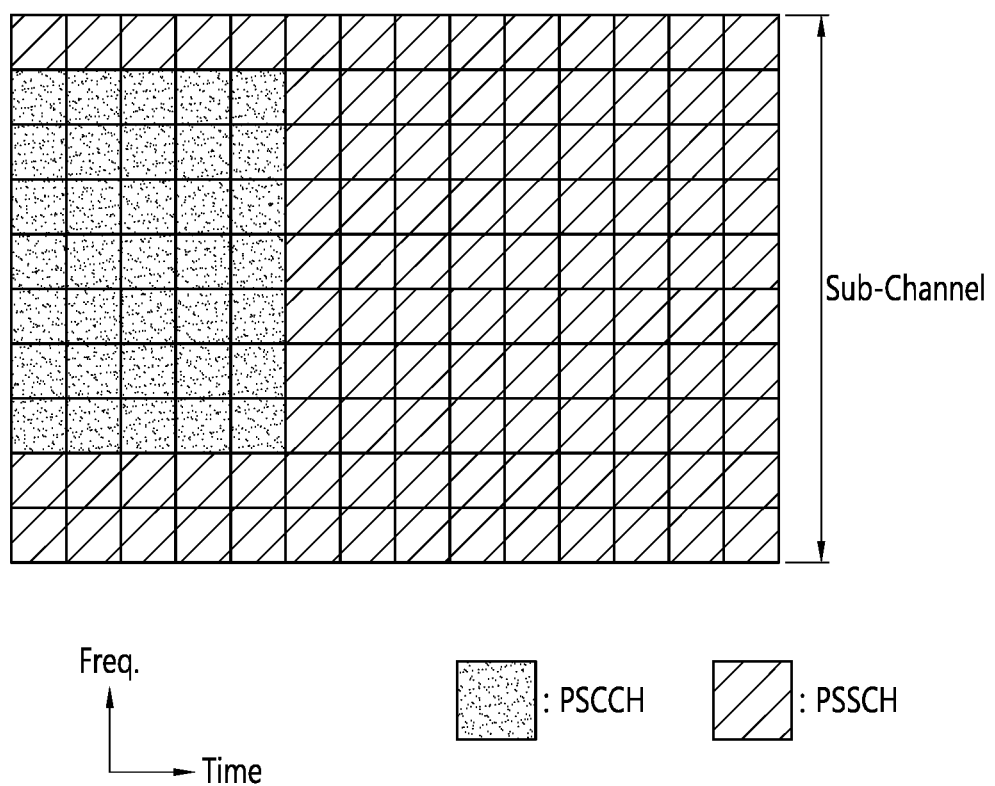

FIGS. 14 to 16 show various examples in which a PSCCH is confined in one sub-channel, based on an embodiment of the present disclosure. The embodiments of FIGS. 14 to 16 may be combined with various embodiments of the present disclosure.

Referring to FIG. 14, a PSCCH may be confined in one sub-channel. The PSCCH may be transmitted in a form confined in the sub-channel. That is, the frequency range of the PSCCH may be configured equal to or smaller than the frequency range of the sub-channel.

For example, specifically, in consideration of In-Band Emission (IBE), a guard may be configured at both ends of a sub-channel, and a PSCCH may be mapped to the middle of the sub-channel. For example, the guard may include one or more RBs. In this case, the guard including one or more RBs may be configured at both ends of the sub-channel, and the PSCCH may be mapped to the middle of the sub-channel. For example, the guard may include one or more subcarriers. In this case, the guard including one or more subcarriers may be configured at both ends of the sub-channel, and the PSCCH may be mapped to the middle of the sub-channel.

For example, referring to FIG. 15, it is assumed that a sub-channel includes 10 RBs and a PSCCH occupies 8 RBs. In this case, the PSCCH may be mapped to the remaining RBs except for the first RB and the last RB of the sub-channel. The technical spirit of the present disclosure is not limited to the embodiment of FIG. 15, and the technical spirit of the present disclosure may be extended to other combinations. For example, if the number of guard RBs is odd, more RBs may be placed in the lowest RB of the sub-channel. For example, if the number of guard RBs is odd, more RBs may be placed in the highest RB of the sub-channel.

For example, referring to FIG. 16, it is assumed that a sub-channel includes 10 RBs and a PSCCH occupies 7 RBs. In this case, there may be three guard RBs. Based on the embodiment of FIG. 16, more RBs may be placed in the lowest RB of the sub-channel. Accordingly, the PSCCH may be mapped to the remaining RBs except for the first RB, the second RB, and the last RB of the sub-channel. Additionally, as the number of RBs for the PSCCH decreases, the number of slots for the PSCCH may increase.

Referring back to FIG. 13, alternatively, in step S1300, resource(s) for the PSCCH may be configured across a plurality of sub-channels.

Figure 17:
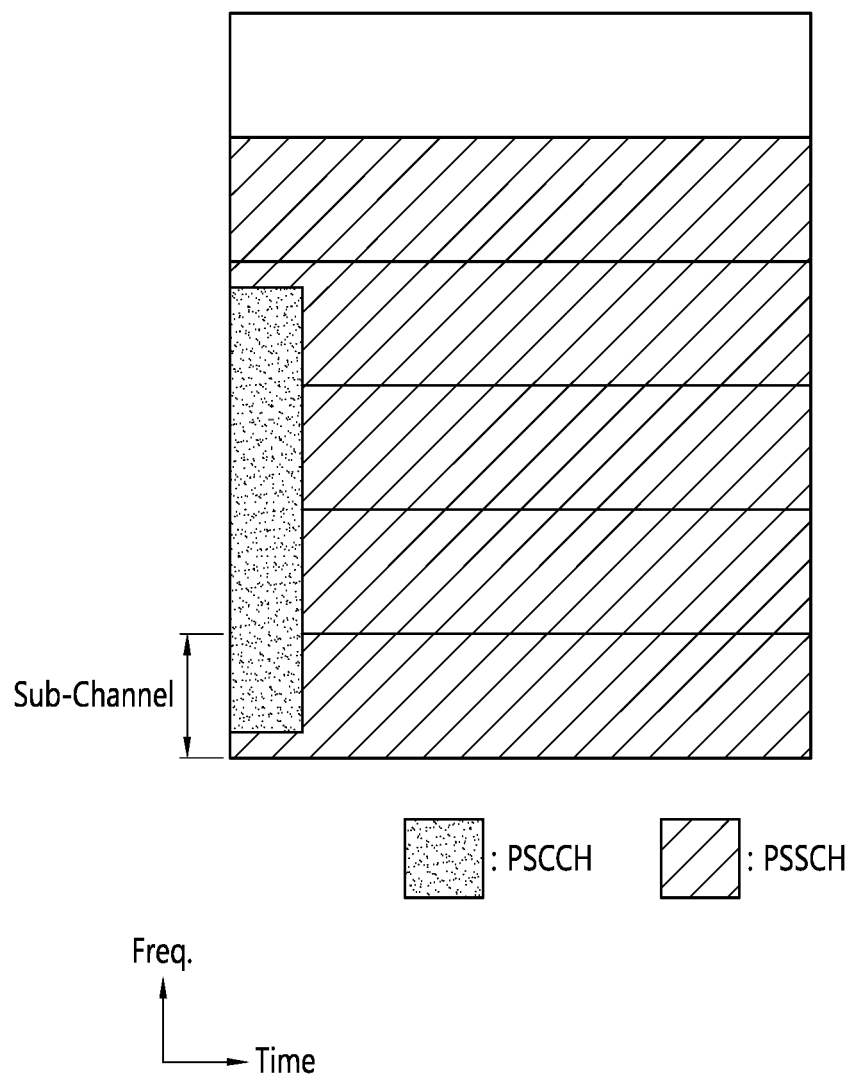
FIGS. 17 and 18 show various examples in which a PSCCH across a plurality of sub-channels, based on an embodiment of the present disclosure.
Figure 18:
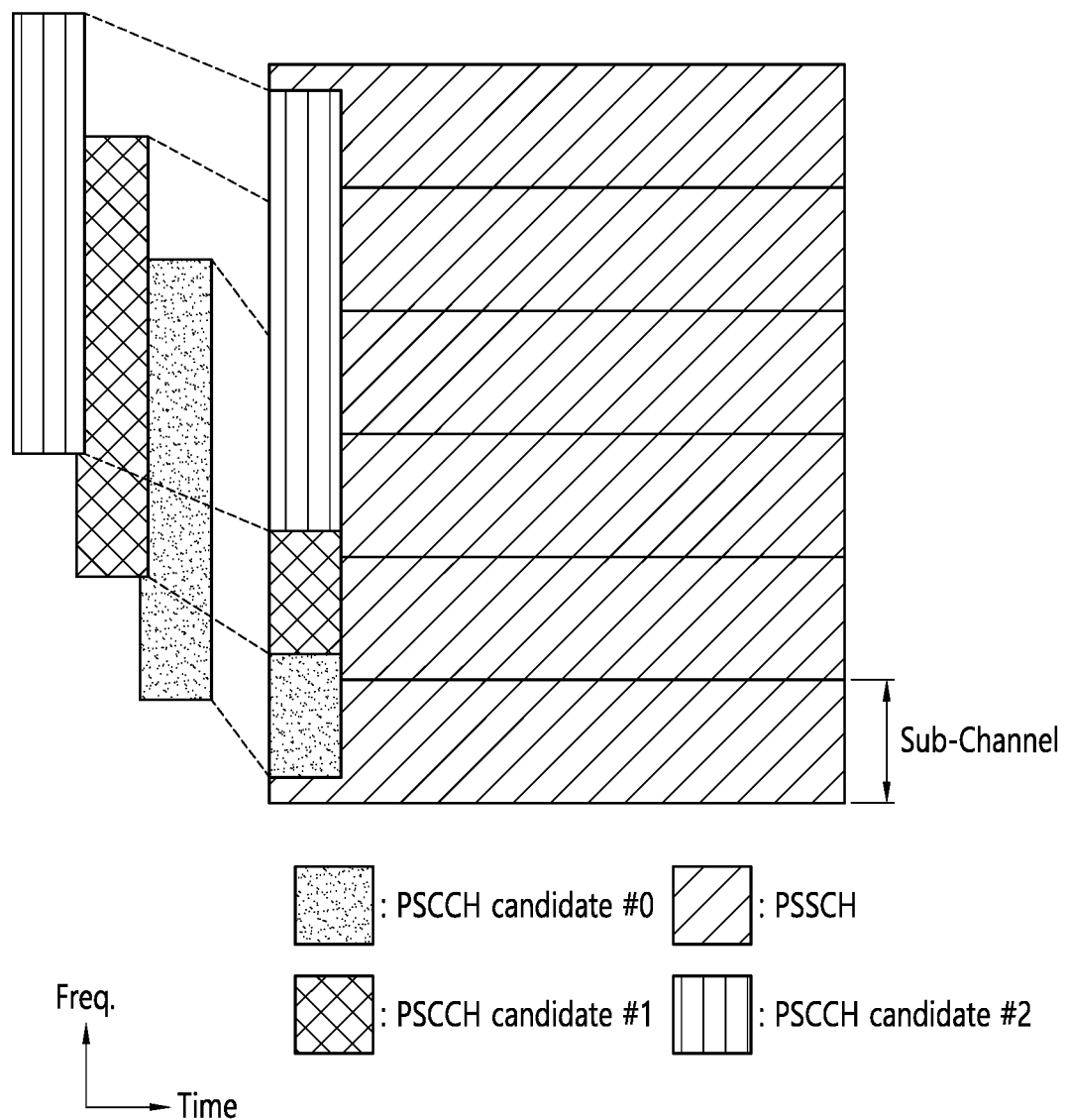

FIGS. 17 and 18 show various examples in which a PSCCH across a plurality of sub-channels, based on an embodiment of the present disclosure. The embodiments of FIGS. 17 and 18 may be combined with various embodiments of the present disclosure.

Referring to FIG. 17, if a PSCCH is transmitted across a plurality of sub-channels, the UE may not expect that RB allocation for a PSSCH is smaller than RB allocation for the PSCCH. For example, the UE may determine that RB allocation for the PSSCH is greater than or equal to RB allocation for the PSCCH.

If a PSCCH is transmitted across a plurality of sub-channels, RB allocation for a PSSCH may be performed in the unit of at least two sub-channels. For example, a starting RB for the PSSCH may be performed in the unit of a first sub-channel that may be smaller than RB allocation for the PSCCH, and an RB length for the PSSCH may be performed in the unit of a second sub-channel that may be equal to or greater than RB allocation for the PSCCH. Through this, scheduling flexibility for the starting RB of the PSSCH can still be obtained.

Referring to FIG. 18, a plurality of PSCCH candidates may overlap each other. Specifically, starting RBs for PSCCHs may be present in each sub-channel. For example, information on sub-channel(s) capable of starting PSCCH may be (pre-)configured for the UE. For example, information on sub-channel(s) capable of starting PSCCH may be configured through a PSBCH indication. In consideration of IBE, a plurality of PSCCHs may be mapped to a region other than some RBs or subcarriers of the first sub-channel and some RBs or subcarriers of the last sub-channel.

Referring back to FIG. 13, in step S1310, the UE may transmit the PSCCH based on the determined resource(s) for the PSCCH. In addition, the UE may transmit a PSSCH related to the transmitted PSCCH to other UE(s).

Based on an embodiment of the present disclosure, the UE can efficiently configure resource(s) for the PSCCH on configured sub-channel(s). Accordingly, a UE performing communication based on one or more sub-channels can efficiently perform SL communication with other UE(s).

Based on an embodiment of the present disclosure, it is necessary to define a basic transmission unit of a PSCCH and an aggregation level for the basic transmission unit for efficient transmission of the PSCCH. Hereinafter, based on an embodiment of the present disclosure, a method for transmitting a PSCCH based on an aggregation level and an apparatus supporting the same will be described.

In the present disclosure, the basic transmission unit of the PSCCH may be referred to as an SL-control channel element (S-CCE). The S-CCE may include X symbols and Y RBs. For example, the S-CCE may consist of Y RBs during X symbols. For example, Y RBs may be equal to or smaller than the size of a sub-channel. A value of X may be derived by the size of the SCI format and/or the target coding rate and/or the number of target REs and/or the value of Y, as shown in Equation 1, Equation 2, Equation 3 or Equation 4.

Based on an embodiment of the present disclosure, various aggregation levels may be supported in various forms with the number of S-CCEs constituting the PSCCH. In addition, basically, time domain resource(s) and/or frequency domain resource(s) that can be extended may have limitations. For example, in the case of time domain resource(s), if there is no limit, processing time may be unnecessarily increased, and it may be difficult to satisfy latency requirements. For example, in the case of frequency domain resource(s), if there is no limit, RB allocation for a PSSCH may be unnecessarily large in order to secure a structure in which the PSSCH overlaps a PSCCH. Accordingly, scheduling flexibility may be decreased. For the above reasons, time domain resource(s) and/or frequency domain resource that can be extended needs to be limited. In addition, time domain resource(s) and/or frequency domain resource(s) that can be extended may be configured for each resource pool.

As an aggregation level increases, the UE may select an S-CCE to be used based on the scheme proposed below.

Figure 19:
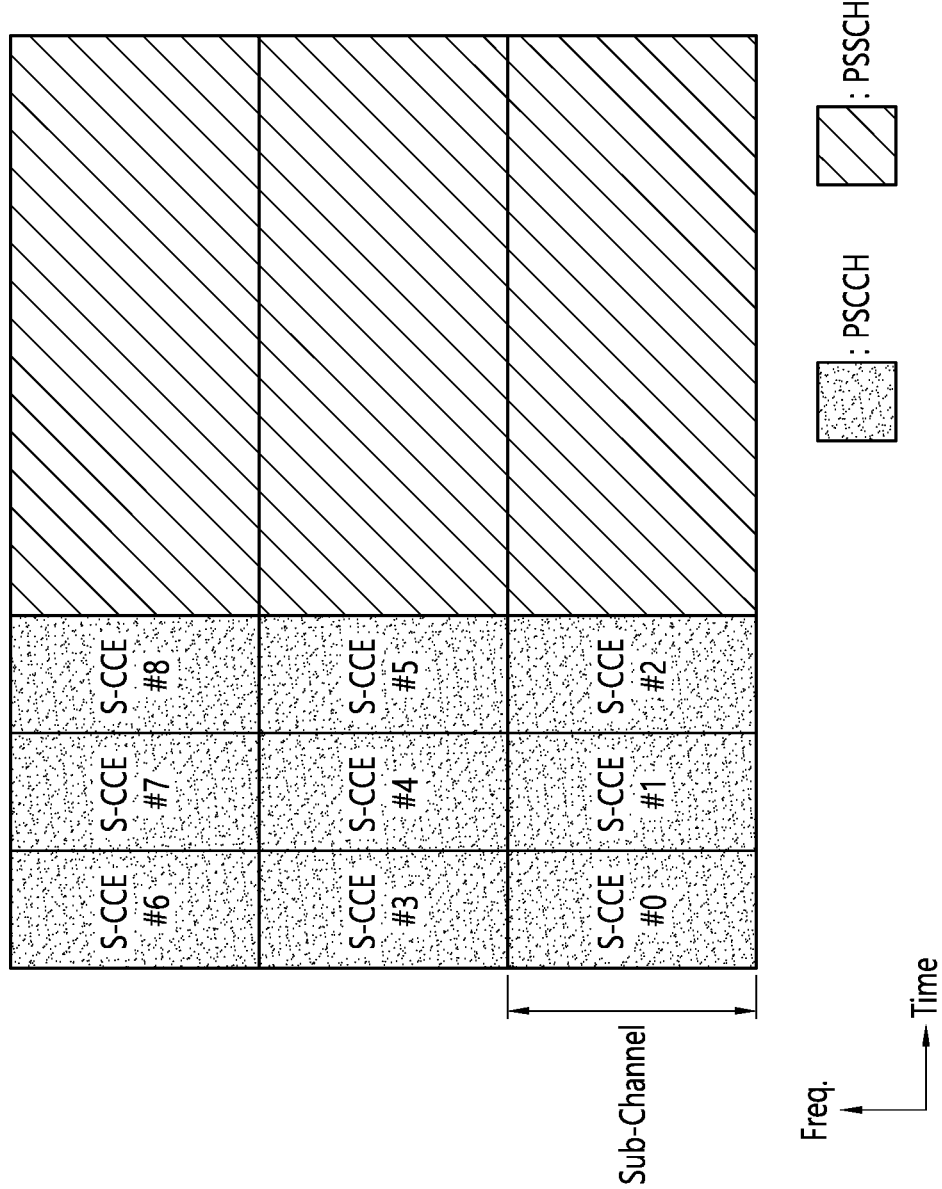
FIG. 19 shows an example in which a UE selects an S-CCE based on an aggregation level, based on an embodiment of the present disclosure.

FIG. 19 shows an example in which a UE selects an S-CCE based on an aggregation level, based on an embodiment of the present disclosure. The embodiment of FIG. 19 may be combined with various embodiments of the present disclosure.

Referring to FIG. 19, first, a UE may select an S-CCE configured on a time axis. Thereafter, the UE may select an S-CCE to be used in a repeating manner after changing a frequency axis. Specifically, assuming that the aggregation level is 4, the UE may select S-CCE #0, S-CCE #1, and S-CCE #2 configured on a time axis. In addition, after changing a frequency axis, the UE may select additional S-CCE #3. The order of selecting an S-CCE configured on a time axis may be a method of selecting an S-CCE that is later in time from an S-CCE that is earlier in time, or may be a method of selecting an S-CCE that is earlier in time from an S-CCE that is later in time.

Based on the above S-CCE selection method, a high aggregation level may be supported for a PSSCH to which one or a small number of sub-channels are allocated. On the other hand, as the aggregation level increases, the delay may increase, and a startable S-CCE index may be limited according to the aggregation level.

Figure 20:
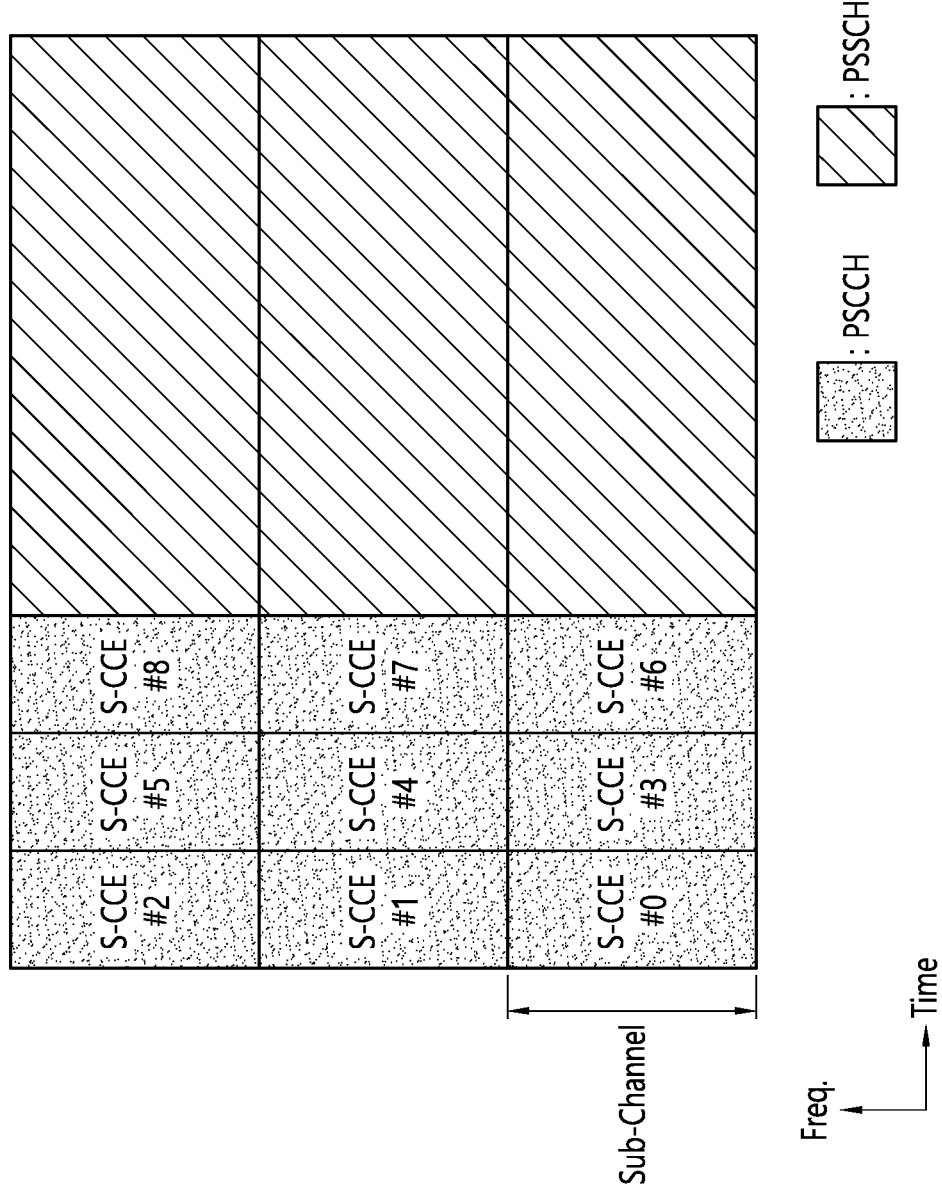
FIG. 20 shows an example in which a UE selects an S-CCE based on an aggregation level, based on an embodiment of the present disclosure.

FIG. 20 shows an example in which a UE selects an S-CCE based on an aggregation level, based on an embodiment of the present disclosure. The embodiment of FIG. 20 may be combined with various embodiments of the present disclosure.

Referring to FIG. 20, first, a UE may select an S-CCE configured on a frequency axis. Thereafter, the UE may select an S-CCE to be used in a repeating manner after changing a time axis. Specifically, assuming that the aggregation level is 4, the UE may select S-CCE #0, S-CCE #1, and S-CCE #2 configured on a frequency axis. In addition, after changing a time axis, the UE may select additional S-CCE #3. The order of selecting an S-CCE configured on a time axis may be a method of selecting an S-CCE that is later in time from an S-CCE that is earlier in time, or may be a method of selecting an S-CCE that is earlier in time from an S-CCE that is later in time.

Based on the S-CCE selection method as described above, the aggregation level may have little or no effect on delay up to a certain level. On the other hand, in order to increase the aggregation level, RB allocation for a PSSCH may need to be increased together. A startable S-CCE index may be limited according to an aggregation level. This is to prevent non-contiguous S-CCE from interworking with one PSCCH. For example, if a PSSCH is configured with two S-CCEs, in FIG. 20, S-CCE #2 and S-CCE #3 may not be bundled. That is, for example, if the aggregation level is 2, S-CCE #2, S-CCE #5, and S-CCE #8 may be excluded from the startable index.

Meanwhile, depending on the number of aggregation levels, the number of blind decoding (BD) performed by a receiving UE for PSCCH detection may be excessive. That is, in order to manage the number of BDs performed by the receiving UE at a suitable level, the number of aggregation levels and/or the number of candidates for PSCCH for each aggregation level and/or supportable SCI format (size) for each candidate for PSCCH may be (pre-)configured for the UE for each resource pool. More specifically, the aggregation level and the SCI format (size) may be associated in combination. More specifically, the aggregation level supported or configured for each SCI format (size) may be different. For example, if the SCI format size is small, the aggregation level may also correspond to a relatively small value. For example, if the SCI format size is large, the aggregation level may correspond to a relatively large value.

Meanwhile, power control for a PSCCH may be performed based on a propagation loss between a UE and a base station (hereinafter, DL pathloss), or based on a propagation loss between a transmitting UE and a receiving UE (hereinafter, SL path loss). If a transmitting UE performs power control for a PSCCH based on the DL pathloss, and if a value of the DL pathloss is smaller than a value of the SL pathloss, the aggregation level for the PSCCH needs to be large. On the other hand, if a value of the DL pathloss is greater than a value of the SL pathloss, the aggregation level for the PSCCH needs to be small. In the above situation, the combination and/or the number of supported aggregation levels for the PSCCH may be related to power control configuration(s) for the PSCCH. For example, the combination or the set of aggregation levels for the PSCCH may be (pre-)configured for the UE for each power control method. Alternatively, the combination or the set of aggregation levels for the PSCCH may be (pre-)configured for the UE for each resource pool.

For example, a method in which a transmitting UE uses a plurality of S-CCEs when transmitting a PSCCH may include: performing, by the transmitting UE, coding for a SCI based on the total number of REs constituting allocated S-CCE(s), and mapping, by the transmitting UE, the corresponding coding bit. For example, a method in which a transmitting UE uses a plurality of S-CCEs when transmitting a PSCCH may include: repeating operations of performing, by the transmitting UE, coding for a SCI based on the total number of REs constituting a single S-CCE, and mapping, by the transmitting UE, the corresponding coding bit to the S-CCE. REs used for mapping PSCCH DMRS(s) may be excluded from the number of REs.

Hereinafter, based on an embodiment of the present disclosure, a method for determining resource(s) for PSCCH demodulation reference signal(s) (DMRS(s)) and an apparatus supporting the same will be described.

In vehicle-to-vehicle communication having a relatively high UE speed in the next communication system, detection performance of a PSCCH may be different based on a DMRS density and/or a mapping method. Specifically, in consideration of doppler spread or coherent time, a high DMRS density may be advantageous. However, if the DMRS density is high, resource(s) for data mapping may be decreased, and a coding gain may be decreased. On the other hand, if the DMRS density is low, channel estimation performance may be decreased. In consideration of the above situation, the UE needs to determine whether or not to transmit DMRS(s) in all RB-symbol pairs to which a PSCCH is mapped and/or transmitted.

Based on an embodiment of the present disclosure, in a situation in which the DMRS density decreases, a method for mapping DMRS(s) in an evenly distributed form on time domain resource(s) for a PSCCH may be considered. Specifically, DMRS(s) may be mapped to the middle among the remaining symbols except for the first symbol of the PSCCH that may be used as an automatic gain control (AGC).

For example, if the PSCCH symbol period is 3 symbols, a symbol in which DMRS(s) is transmitted may be the second symbol.

For example, if the PSCCH symbol period is 4 symbols, a symbol in which DMRS(s) is transmitted may be the third symbol. In this case, if the PSCCH is mapped to avoid the AGC symbol, it may be the second symbol in the PSCCH symbol period.

For example, if the PSCCH symbol period is 5 symbols, a symbol in which DMRS(s) is transmitted may be the third symbol.

Figure 21:
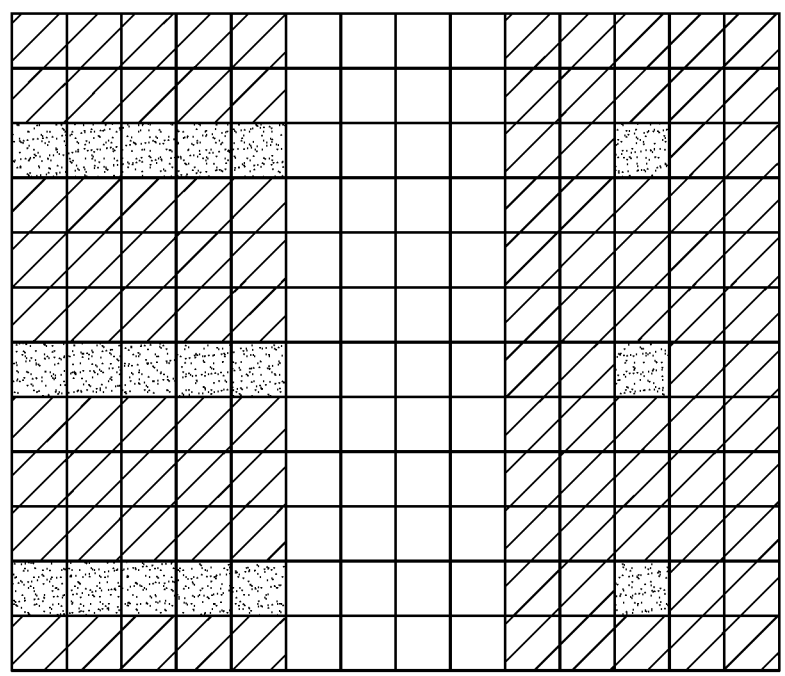
FIG. 21 shows an example in which DMRS(s) is transmitted in the third symbol when the PSCCH symbol interval is 5 symbols, based on an embodiment of the present disclosure.

FIG. 21 shows an example in which DMRS(s) is transmitted in the third symbol when the PSCCH symbol interval is 5 symbols, based on an embodiment of the present disclosure. The embodiment of FIG. 21 may be combined with various embodiments of the present disclosure.

For example, if the PSCCH symbol period is 7 symbols, a symbol in which DMRS(s) is transmitted may be the fourth symbol.

Based on an embodiment of the present disclosure, if a center symbol cannot be precisely selected, a symbol for which DMRS(s) is transmitted may be a symbol mapped to an earlier point in the center in consideration of processing time.

Based on an embodiment of the present disclosure, a higher DMRS density may be required in a time domain according to subcarrier spacing and/or symbol duration and/or target UE speed. In this case, for example, DMRS(s) may be mapped to symbol(s) with an even index. Alternatively, for example, DMRS(s) may be mapped to symbol(s) with an odd index. In general, DMRS(s) may be mapped to symbol(s) corresponding to a symbol index satisfying Equation 5.

$$\text{symbol index mod } X = Y \qquad \text{[Equation 5]}$$

For example, based on Equation 5, DMRS(s) may be mapped to symbol(s) corresponding to symbol index Y.

Meanwhile, time-frequency resources for PSCCHs may overlap between different transmitting UEs. If at least orthogonality is guaranteed between different PSCCH DMRSs, spatial multiplexing may be performed between different PSCCHs according to channel conditions. That is, it may be possible for a receiving UE to distinguish and detect a plurality of PSCCHs having overlapping resources. Therefore, securing orthogonality between PSCCH DMRSs may help improve the performance of SL communication. Based on an embodiment of the present disclosure, if a UE generates a PSCCH DMRS sequence, the UE may apply a plurality of random seed values and/or an orthogonal cover code (OCC) and/or a cyclic shift (CS).

Figure 22:
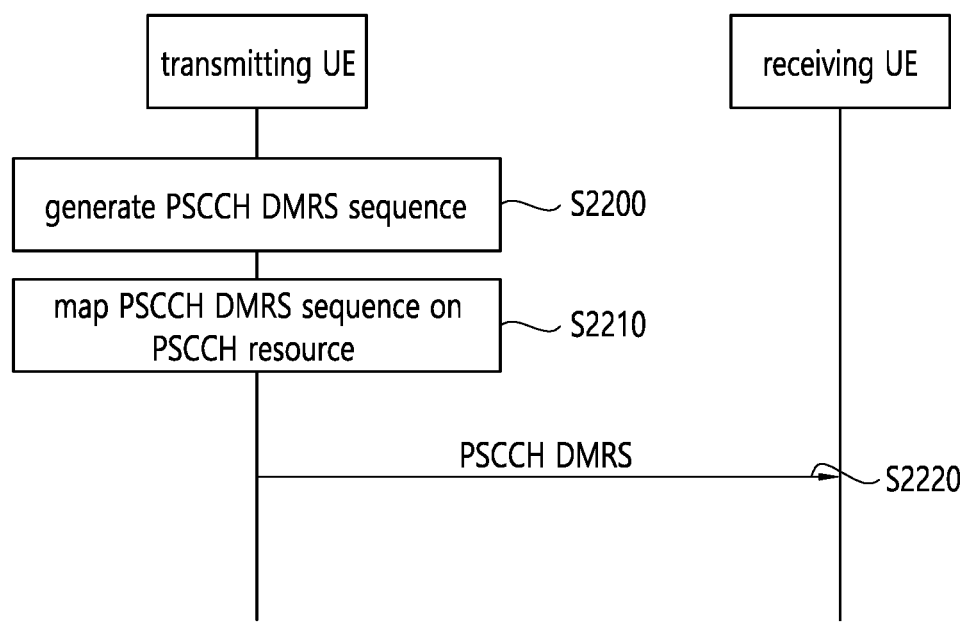
FIG. 22 shows a procedure for a UE to transmit PSCCH DMRS(s), based on an embodiment of the present disclosure. The embodiment of FIG. 22 may be combined with various embodiments of the present disclosure.

FIG. 22 shows a procedure for a UE to transmit PSCCH DMRS(s), based on an embodiment of the present disclosure. The embodiment of FIG. 22 may be combined with various embodiments of the present disclosure.

Referring to FIG. 22, in step S2200, a transmitting UE may generate DMRS sequence(s) for a PSCCH. For convenience of description, the DMRS sequence(s) for the PSCCH may be referred to as PSCCH DMRS sequence(s). For example, PSCCH DMRS(s) may be reference signal(s) used by a receiving UE to decode the PSCCH. For example, the transmitting UE may generate PSCCH DMRS sequence(s) in a pseudo random method. In this case, an initial shift register value may be parameter-based, which may have various values.

For example, PSCCH DMRS sequence(s) may be generated based on Table 5.

TABLE 5

The sequence $r_l(m)$ shall be generated according to $$r_l(m) = \frac{1}{\sqrt{2}}(1 - 2c(m)) + j\frac{1}{\sqrt{2}}(1 - 2c(m+1))$$

where the pseudo-random sequence $c(m)$ is defined in table 6. The pseudo-random sequence generator shall be initialized with
$c_{init} = (2^{17}(N_{symb}^{slot} n_{s,f}^{\mu} + l + 1)(2N_{ID} + 1) + 2N_{ID}) \bmod 2^{31}$
where $l$ is the OFDM symbol number within the slot, $n_{s,f}^{\mu}$ is the slot number within a frame, and $N_{ID} \in \{0, 1, \ldots, 65535\}$ is given by the higher-layer parameter pscch-DMRS-ScramblingID For example, pseudo random sequence(s) may be defined as shown in Table 6.

TABLE 6

Generic pseudo-random sequences are defined by a length-31 Gold sequence. The output sequence $c(n)$ of length $M_{PN}$, where $n = 0, 1, \ldots, M_{PN} - 1$, is defined by
$c(n) = (x_1(n + N_C) + x_2(n + N_C)) \bmod 2$
$x_1(n + 31) = (x_1(n + 3) + x_1(n)) \bmod 2$
$x_2(n + 31) = (x_2(n + 3) + x_2(n + 2) + x_2(n + 1) + x_2(n)) \bmod 2$
where $N_C = 1600$ and the first m-sequence $x_1(n)$ shall be initialized with $x_1(0) = 1, x_1(n) = 0, n = 1, 2, \ldots, 30$. The initialization of the second m-sequence, $x_2(n)$, is denoted by
$c_{init} = \sum_{i=0}^{30} x_2(i) \cdot 2^i$ with the value depending on the application of the sequence In step S2210, the transmitting UE may apply the OCC to the PSCCH DMRS sequence(s). In addition, the transmitting UE may map the PSCCH DMRS sequence(s) to which the OCC is applied on PSCCH resource(s). For example, the transmitting UE may apply the OCC to PSCCH DMRS sequence(s) mapped to a plurality of PSCCH DMRS REs in the same symbol. For example, PSCCH DMRS RE(s) may be resource element(s) to which PSCCH DMRS(s) or PSCCH DMRS sequence(s) is mapped. For example, the transmitting UE may apply the OCC to a plurality of PSCCH DMRS REs in the same symbol. For example, the transmitting UE may apply the OCC to a plurality of PSCCH DMRS REs in the same RB in the same symbol. For example, the transmitting UE may apply the OCC to the same subcarrier in the same RB across a plurality of symbols. For example, the transmitting UE may apply the OCC to a plurality of PSCCH DMRS REs and a plurality of symbols in the same RB. For example, the transmitting UE may apply the CS to the PSCCH DMRS sequence(s) in the same symbol. Based on the above-described method, DMRS sequence(s) may exist in various forms.

For example, the transmitting UE may map PSCCH DMRS sequence(s) to physical resource(s) based on Table 7.

TABLE 7

The sequence $r_l(m)$ shall be multiplied with the amplitude scaling factor $\beta_{PSCCH}$ in order to conform to the transmit power specified in 3GPP TS 38.213 V16.0.0 and mapped in sequence starting with $r_l(0)$ to resource elements $(k, l)_{p,\mu}$ in a slot on antenna port p = 2000 according to
$a_{k,l}^{(p,\mu)} = \beta_{DMRS}^{PSCCH} w_F(m) r_l(3n + k')$
$k = nN_{sc}^{RB} + 4k' + 1$
$k' = 0, 1, 2$
$n = 0, 1, \ldots$
$m = (3n + k') \bmod 4$
where $w_F(m)$ is given by Table 8.
where the following conditions are fulfilled
  they are within the resource elements constituting the PSCCH
The reference point for k is subcarrier 0 in common resource block 0.
The quantity l is the OFDM symbol number within the slot.

Referring to Table 7, the UE may apply the OCC (i.e., $w_F(m)$) to PSCCH DMRS sequence(s) and map it to physical resource(s). For example, OCCs applied to PSCCH DMRS sequence(s) may be defined as shown in Table 8.

TABLE 8

|  | $w_F(m)$ | | | |
| --- | --- | --- | --- | --- |
|  | m = 0 | m = 1 | m = 2 | m = 3 |
| 1st row | +1 | +1 | +1 | +1 |
| 2nd row | +1 | −1 | +1 | −1 |
| 3rd row | +1 | +1 | −1 | −1 |
| 4th row | +1 | −1 | −1 | +1 |

Table 8 is only an example of OCCs, and the OCCs applied to PSCCH DMRS(s) may be defined by various methods.

In step S2220, the transmitting UE may randomly select one of a plurality of DMRS sequences and use it for PSCCH transmission. For example, the transmitting UE, which applies the OCC to PSCCH DMRS sequence(s) and maps it to PSCCH resource(s), may transmit the PSCCH and/or PSCCH DMRS(s) to the receiving UE. Here, the receiving UE may attempt PSCCH decoding for possible DMRS combinations.

Figure 23:
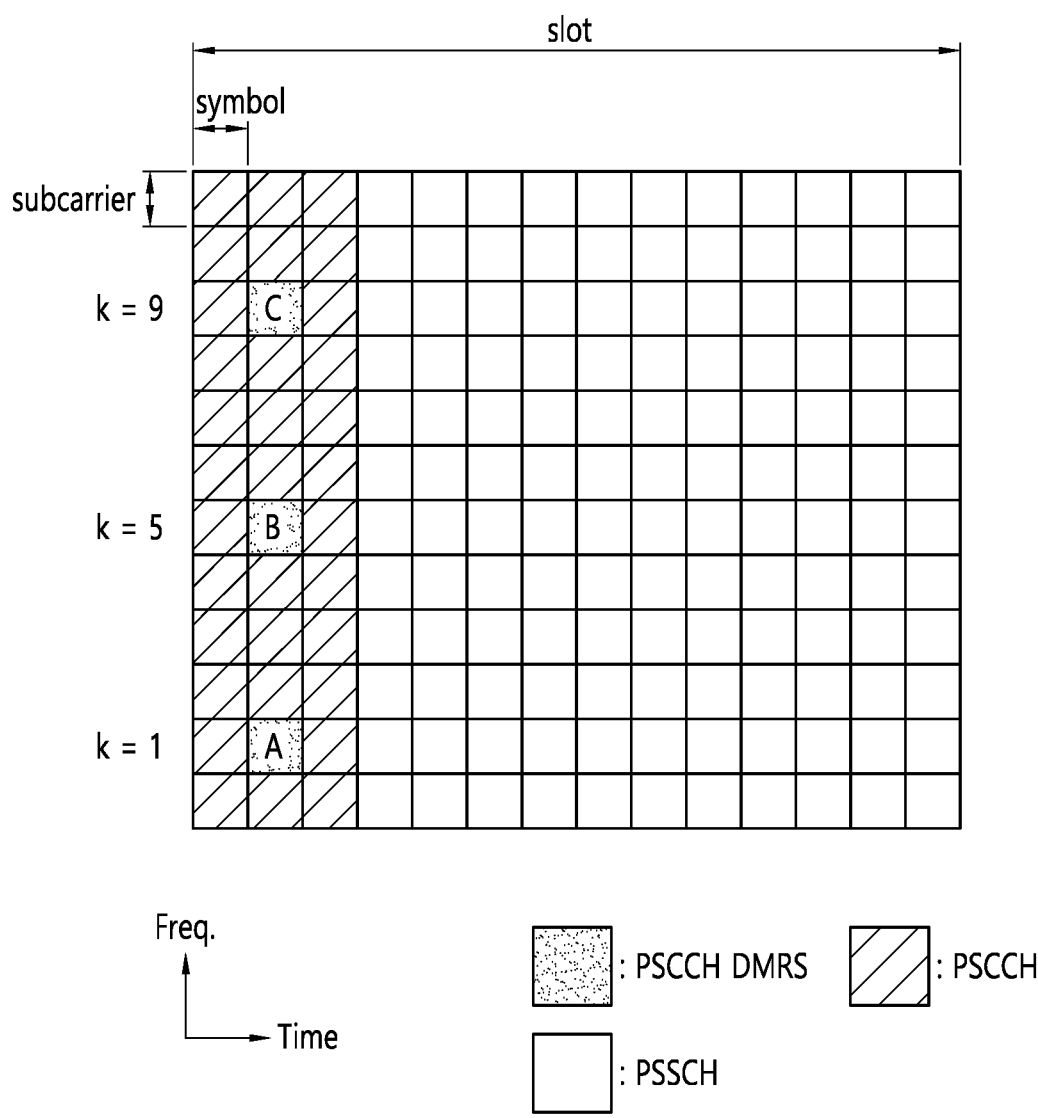
FIG. 23 shows a method for a UE to apply an OCC to PSCCH DMRS sequence(s) and map it to physical resource (s), based on an embodiment of the present disclosure.

FIG. 23 shows a method for a UE to apply an OCC to PSCCH DMRS sequence(s) and map it to physical resource(s), based on an embodiment of the present disclosure. The embodiment of FIG. 23 may be combined with various embodiments of the present disclosure.

Referring to FIG. 23, PSCCH DMRS sequence(s) may be mapped to the second symbol on PSCCH resource(s). In addition, based on Table 7, PSCCH DMRS sequence(s) may be mapped to $2^{nd}$ subcarrier (a subcarrier corresponding to k=1), $6^{th}$ subcarrier (a subcarrier corresponding to k=5) and $10^{th}$ subcarrier (subcarrier corresponding to k=9) on PSCCH resource(s). In this case, for example, if the transmitting UE determines to apply the OCC corresponding to $1^{st}$ row of Table 8 to PSCCH DMRS sequence(s), the transmitting UE may apply OCC [+1, +1, +1] to PSCCH DMRS sequences mapped to [A, B, C], respectively. For example, if the transmitting UE determines to apply the OCC corresponding to $3^{rd}$ row of Table 8 to PSCCH DMRS sequence(s), the transmitting UE may apply OCC [+1, +1, −1] to PSCCH DMRS sequences mapped to [A, B, C], respectively.

Meanwhile, the length of the OCC (hereinafter, OCC length) may be configured for the UE. For example, a base station may transmit information/configuration related to the OCC length to the UE. For example, the OCC length may be configured to be larger than the number of DMRS REs in the same RB. In this case, the OCC may be applied across a plurality of RBs.

Meanwhile, depending on a configuration of the number of RBs for a PSCCH, a specific OCC length may not be supported for the UE. For example, it is assumed that the OCC length is 2, the number of RBs allocated for the PSCCH is not an even number, and the UE applies the OCC with length 2 to PSCCH DMRS(s). In this case, a form in which some DMRS REs remain may occur, and for this reason, orthogonality with respect to DMRS(s) may not be secured again. Therefore, if the number of RBs allocated for the PSCCH is an odd number, the UE may not apply an even-length OCC to PSCCH DMRS(s). Alternatively, for example, it is assumed that the OCC length is 4, the number of RBs allocated for the PSCCH is not a multiple of 4, and the UE applies the OCC with length 4 to PSCCH DMRS(s). In this case, the OCC may not be applied properly. Accordingly, if the number of RBs allocated for the PSCCH is not a multiple of 4, the UE may not apply the OCC with length 4 to PSCCH DMRS(s).

For example, depending on the number of RBs allocated for a PSCCH, the UE may apply different OCC lengths to PSCCH DMRS(s). Alternatively, for example, depending on the number of RBs allocated for a PSCCH, whether or not the OCC length is applied may be different. For example, if the number of RBs for the PSCCH is 15 or 25, the UE may not apply the OCC to PSCCH DMRS(s). Alternatively, for example, if the number of RBs for the PSCCH is 15 or 25, the UE may change the OCC length applied to PSCCH DMRS(s) to 3. Otherwise, the UE may apply the OCC with length 2 or 4 to PSCCH DMRS(s). For example, if the number of RBs for the PSCCH is 10, the UE may change the OCC length applied to PSCCH DMRS(s) to 2 or 3. Otherwise, the UE may apply the OCC with length 4 to PSCCH DMRS(s).

Alternatively, for the number of RBs allocated for a specific PSCCH, the UE may use/apply a plurality of OCC lengths to PSCCH DMRS(s). Specifically, an OCC length additionally used/applied by the UE may be a value greater than the pre-configured OCC length. As an advantage to this, multiplexing capacity along the OCC length can be maintained. For example, if the number of RBs for the PSCCH is 10 and the OCC length is 4, OCC lengths that the UE actually applies to PSCCH DMRS(s) may be 4 and 6. For example, the UE may apply an OCC with length 4 from the lowest DMRS RE, and may apply an OCC with length 6 to the last 6 REs. For example, if the number of RBs allocated for the PSCCH is N, and the OCC length is L, the UE may apply an OCC with length L "floor (3*N/L)−1" times from the lowest DMRS RE, and the UE may apply an OCC with length "3*N−(floor (3*N/L)−1)*L" to the remaining "3*N−(floor (3*N/L)−1)*L" DMRS REs. Alternatively, for example, the UE may apply an OCC with length 4 from the highest DMRS RE, and may apply an OCC with length 6 to the last 6 REs. For example, if the number of RBs allocated for the PSCCH is N, and the OCC length is L, the UE may apply an OCC with length L "floor (3*N/L)−1" times from the highest DMRS RE, and the UE may apply an OCC with length "3*N−(floor (3*N/L)−1)*L" to the remaining "3*N−(floor (3*N/L)−1)*L" DMRS REs.

Alternatively, for example, the number of RBs allocated for the PSCCH may be limited or changed by a multiple of the OCC length to be applied to PSCCH DMRS(s). For example, length 10 may be changed to 8 or 12. For example, length 15 may be changed to 12 or 16. For example, length 25 may be changed to 24 or 28.

Based on an embodiment of the present disclosure, according to subcarrier spacing, symbol duration, and/or target UE speed, etc., DMRS for decoding the PSCCH may be efficiently mapped within resource(s) in which the PSCCH is transmitted.

Figure 24:
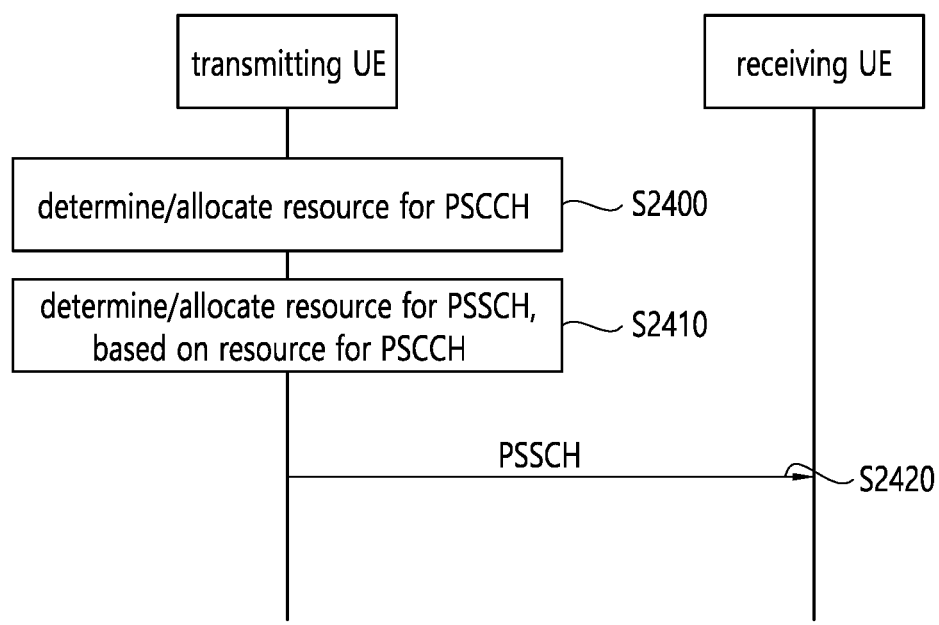
FIG. 24 shows a procedure in which a transmitting UE, which determines/allocates resource(s) for a PSSCH, performs SL communication with a receiving UE, based on an embodiment of the present disclosure.

FIG. 24 shows a procedure in which a transmitting UE, which determines/allocates resource(s) for a PSSCH, performs SL communication with a receiving UE, based on an embodiment of the present disclosure. The embodiment of FIG. 24 may be combined with various embodiments of the present disclosure.

Referring to FIG. 24, in step S2400, a transmitting UE may determine/allocate resource(s) for a PSCCH.

Based on an embodiment of the present disclosure, the transmitting UE may determine resource(s) for the PSCCH within one sub-channel.

If resource(s) for the PSCCH is configured in one sub-channel, the UE may (implicitly) derive PSCCH resource(s) based on the number of RBs included in a sub-channel. For example, if a sub-channel is (pre-)configured for the UE, the UE may (implicitly) determine PSCCH resource(s) based on the number of RBs included in the sub-channel. For example, if a sub-channel is indicated to the UE through a PSBCH, the UE may (implicitly) determine PSCCH resource(s) based on the number of RBs included in the sub-channel. For example, if the size of the sub-channel is 10 RB, 10 RB may be allocated for the PSCCH. For example, if the size of the sub-channel is 10 RB, 8 RB may be allocated for the PSCCH in consideration of an upper guard RB and a lower guard RB. Furthermore, the number of symbols (i.e., symbol period (value)) for the PSCCH may also be autonomously or automatically configured by the UE. Alternatively, the symbol period for the PSCCH may be (pre-)configured for the UE. Alternatively, the symbol period for the PSCCH may be indicated or informed to the UE through a PSBCH.

Alternatively, if resource(s) for the PSCCH is configured in one sub-channel, the UE may receive configuration for frequency resource(s) and/or a symbol period for the PSCCH from a base station. The configuration for the frequency resource(s) and/or the symbol period for the PSCCH may be (pre-)configured for the UE. Alternatively, the configuration for the frequency resource(s) and/or the symbol period for the PSCCH may be transmitted to the UE through a PSBCH indication. In this case, the UE may not expect that indicated and/or configured RB allocation of the PSCCH is larger than the size of the sub-channel. For example, the UE may determine that indicated and/or configured RB allocation of the PSCCH is smaller than or equal to the size of the sub-channel.

Alternatively, based on an embodiment of the present disclosure, the transmitting UE may determine resource(s) for a PSCCH across a plurality of sub-channels. If a PSCCH is transmitted across a plurality of sub-channels, RB allocation for a PSSCH may be performed in the unit of at least two sub-channels. For example, a starting RB for the PSSCH may be performed in the unit of a first sub-channel that may be smaller than RB allocation for the PSCCH, and an RB length for the PSSCH may be performed in the unit of a second sub-channel that may be equal to or greater than RB allocation for the PSCCH. Through this, scheduling flexibility for the starting RB of the PSSCH can still be obtained.

In step S2410, based on resource(s) for the PSCCH, the transmitting UE may determine/allocate resource(s) for the PSSCH. In consideration of In-Band Emission (IBE), the PSCCH may be located in the middle of resource allocation for the PSSCH. Considering the SCI overhead, the start sub-channel and/or the end sub-channel of the PSSCH may be related to the start sub-channel and/or the end sub-channel of the corresponding PSCCH. Alternatively, the start sub-channel and/or the end sub-channel of the PSSCH may be related to the sub-channel to which RB(s) for the corresponding PSCCH belongs.

For example, the start sub-channel of PSSCH may be configured to the previous N-th sub-channel from the start sub-channel of the PSCCH, and the end sub-channel of the PSSCH may be configured to the next N-th sub-channel from the start sub-channel of the PSCCH. For example, the start sub-channel of PSSCH may be configured to the previous N-th sub-channel from the end sub-channel of the PSCCH, and the end sub-channel of the PSSCH may be configured to the next N-th sub-channel from the end sub-channel of the PSCCH. For example, the start sub-channel of PSSCH may be configured to the previous N-th sub-channel from the middle sub-channel of the PSCCH, and the end sub-channel of the PSSCH may be configured to the next N-th sub-channel from the middle sub-channel of the PSCCH. For example, the start sub-channel of the PSSCH may be configured to the previous N-th sub-channel from a specific sub-channel of the PSCCH, and the end sub-channel of the PSSCH may be configured to the next N-th sub-channel from the specific sub-channel of the PSCCH.

For example, the start sub-channel of the PSSCH may be configured to the previous N-th sub-channel from the start sub-channel of the PSCCH, and the end sub-channel of the PSSCH may be configured to the next M-th sub-channel from the end sub-channel of the PSCCH. For example, the start sub-channel of the PSSCH may be configured to the previous N-th sub-channel from the start sub-channel of the PSCCH, and the end sub-channel of the PSSCH may be configured to the next M-th sub-channel from the start sub-channel of the PSCCH. For example, the start sub-channel of the PSSCH may be configured to the previous N-th sub-channel from the end sub-channel of the PSCCH, and the end sub-channel of the PSSCH may be configured to the next M-th sub-channel from the end sub-channel of the PSCCH. For example, the start sub-channel of PSSCH may be configured to the previous N-th sub-channel from the middle sub-channel of the PSCCH, and the end sub-channel of the PSSCH may be configured to the next M-th sub-channel from the middle sub-channel of the PSCCH. For example, the start sub-channel of the PSSCH may be configured to the previous N-th sub-channel from a specific sub-channel of the PSCCH, and the end sub-channel of the PSSCH may be configured to the next M-th sub-channel from the specific sub-channel of the PSCCH.

For example, N and M may be integers greater than or equal to zero. Hereinafter, N and M may be referred to as an offset. For example, the offset may be (pre-)configured for the UE from a base station. For example, the offset may be pre-defined in the system. For example, the offset may be implicitly configured by the UE. For example, the UE may configure the offset based on the size of SL information or status of SL channel.

Figure 25:
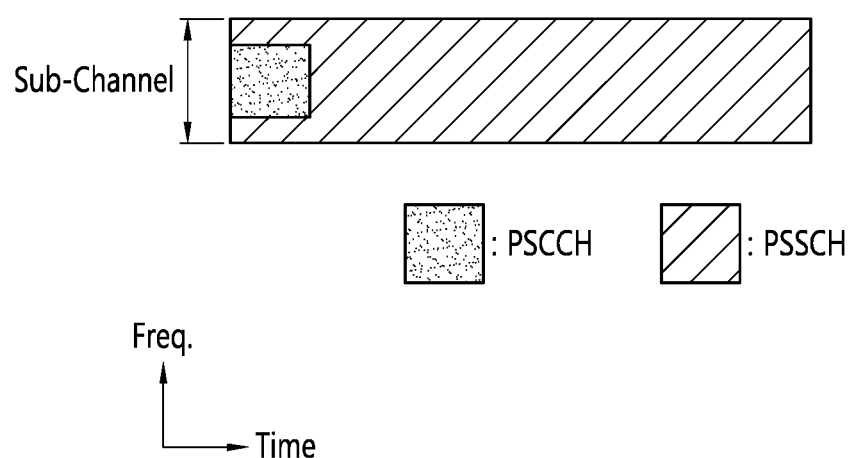
FIG. 25 shows an example in which an offset is a zero sub-channel, based on an embodiment of the present disclosure.

FIG. 25 shows an example in which an offset is a zero sub-channel, based on an embodiment of the present disclosure. The embodiment of FIG. 25 may be combined with various embodiments of the present disclosure.

Figure 26:
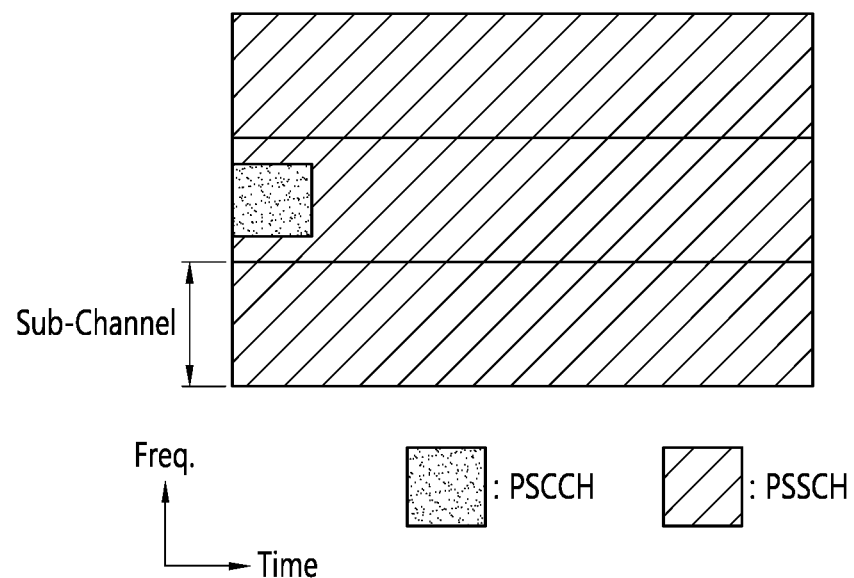
FIGS. 26 and 27 show an example in which an offset is one sub-channel, based on an embodiment of the present disclosure.
Figure 27:
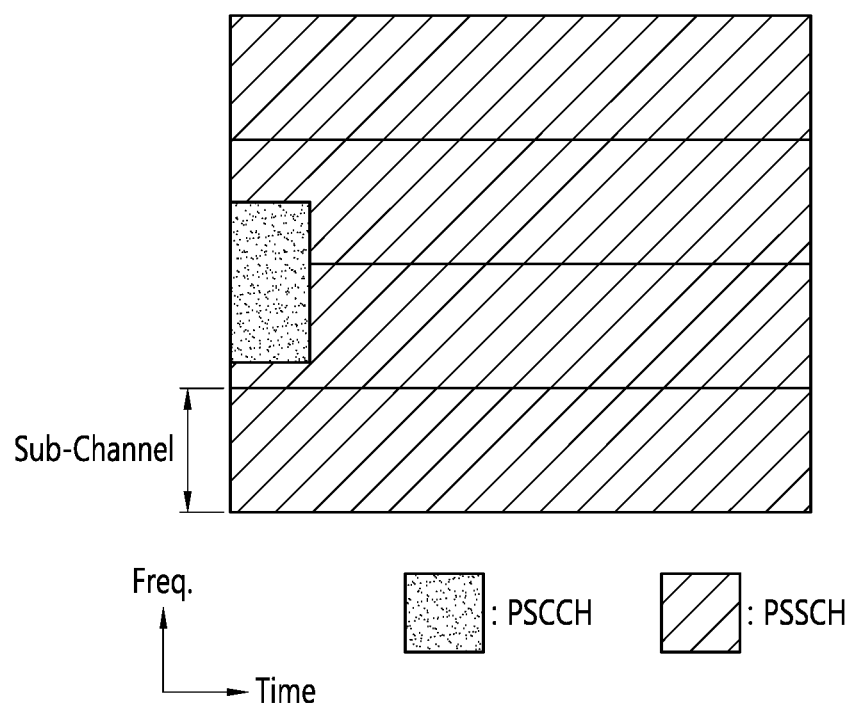

FIGS. 26 and 27 show an example in which an offset is one sub-channel, based on an embodiment of the present disclosure. The embodiments of FIGS. 26 and 27 may be combined with various embodiments of the present disclosure.

Figure 28:
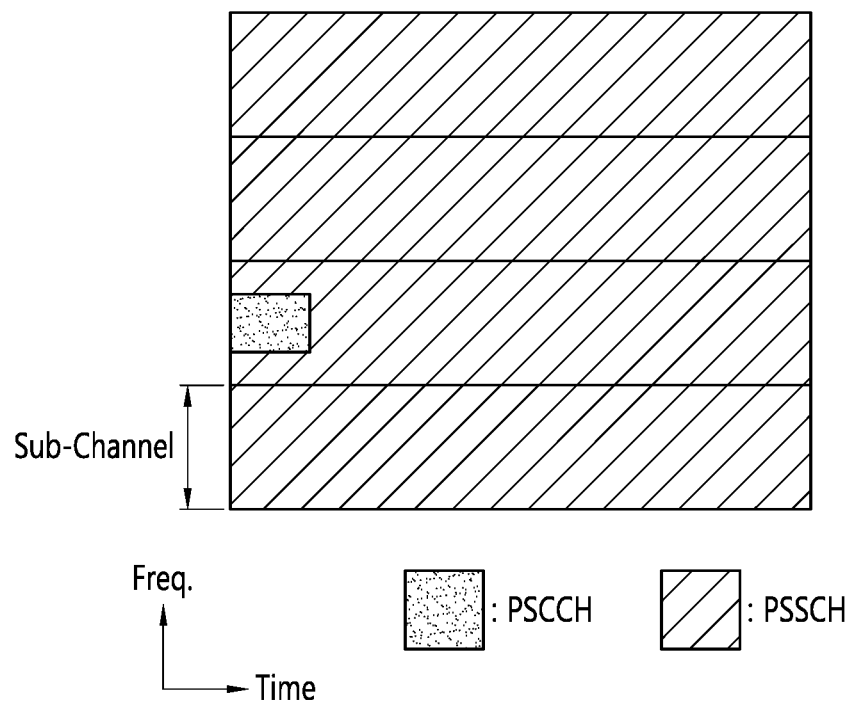
FIG. 28 shows an example in which an offset from a start sub-channel of a PSSCH and an offset from an end sub-channel of a PSSCH are configured differently, based on an embodiment of the present disclosure.

FIG. 28 shows an example in which an offset from a start sub-channel of a PSSCH and an offset from an end sub-channel of a PSSCH are configured differently, based on an embodiment of the present disclosure. The embodiment of FIG. 28 may be combined with various embodiments of the present disclosure.

Based on an embodiment of the present disclosure, if a PSSCH is allocated in a virtual resource block (VRB) or a sub-channel domain, the PSCCH may be transmitted in the middle sub-channel of PSSCH allocation in the VRB. For example, depending on the size of the allocated sub-channel, the PSCCH may be transmitted in ±1 sub-channel.

Figure 29:
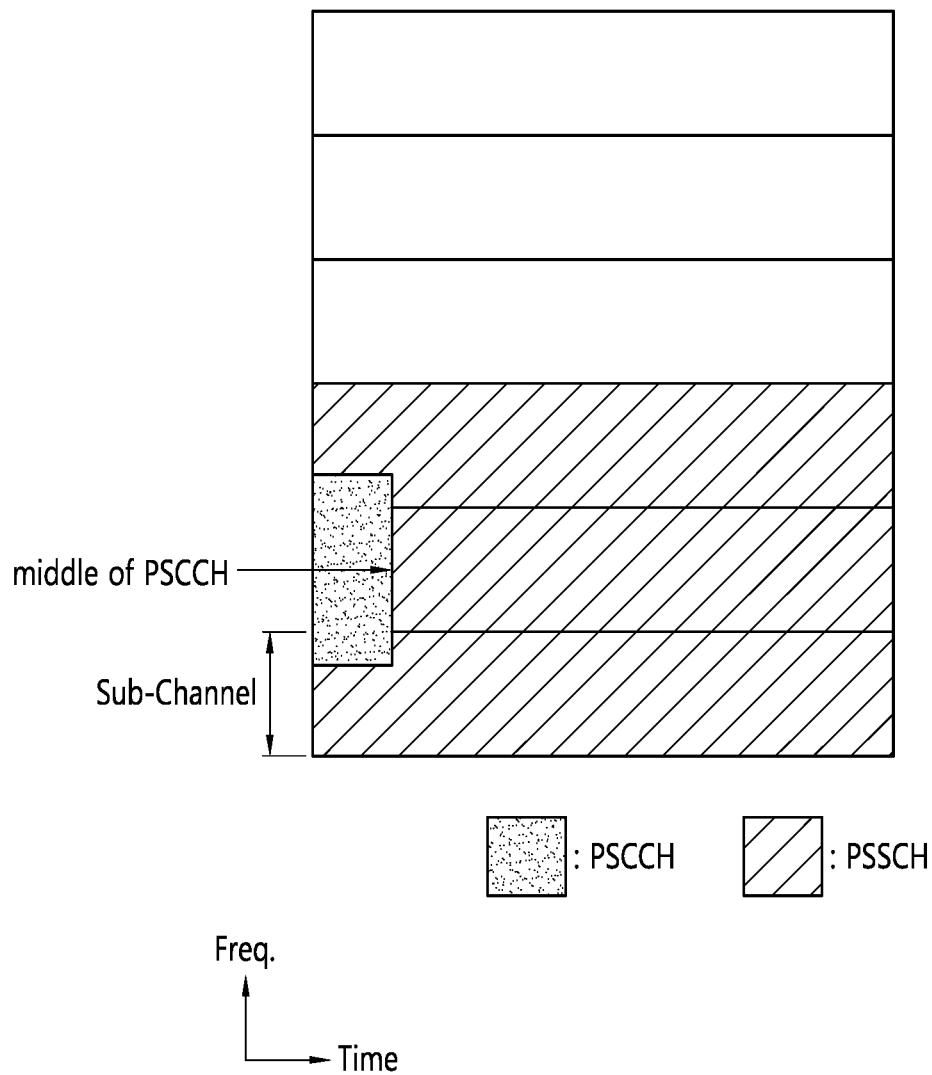
FIG. 29 shows an example in which a subchannel corresponding to the middle of a PSCCH is located in the middle of a corresponding PSSCH allocation, based on an embodiment of the present disclosure.

FIG. 29 shows an example in which a subchannel corresponding to the middle of a PSCCH is located in the middle of a corresponding PSSCH allocation, based on an embodiment of the present disclosure. The embodiment of FIG. 29 may be combined with various embodiments of the present disclosure.

Figure 30:
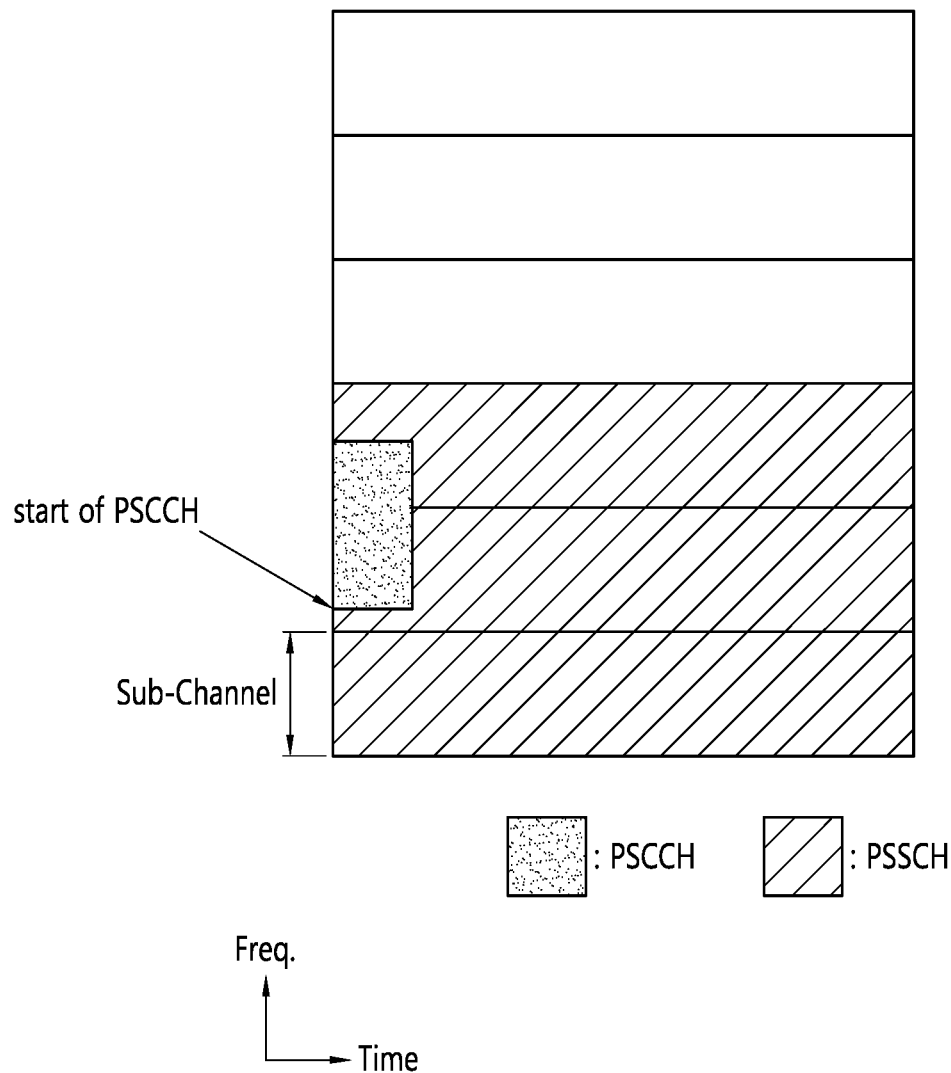
FIG. 30 shows an example in which a subchannel corresponding to the start of a PSCCH is located in the middle of a corresponding PSSCH allocation, based on an embodiment of the present disclosure.

FIG. 30 shows an example in which a subchannel corresponding to the start of a PSCCH is located in the middle of a corresponding PSSCH allocation, based on an embodiment of the present disclosure. The embodiment of FIG. 30 may be combined with various embodiments of the present disclosure.

If domain(s) to which no resources are actually allocated exists according to the resource pool, a transmitting UE may perform clipping. For example, the transmitting UE may not allocate resource(s) for a PSSCH to a sub-channel out of the resource pool. Accordingly, the number of sub-channels transmitted by the transmitting UE to a receiving UE through a SCI may be different from the number of sub-channels actually allocated according to the location of a PSCCH.

Figure 31:
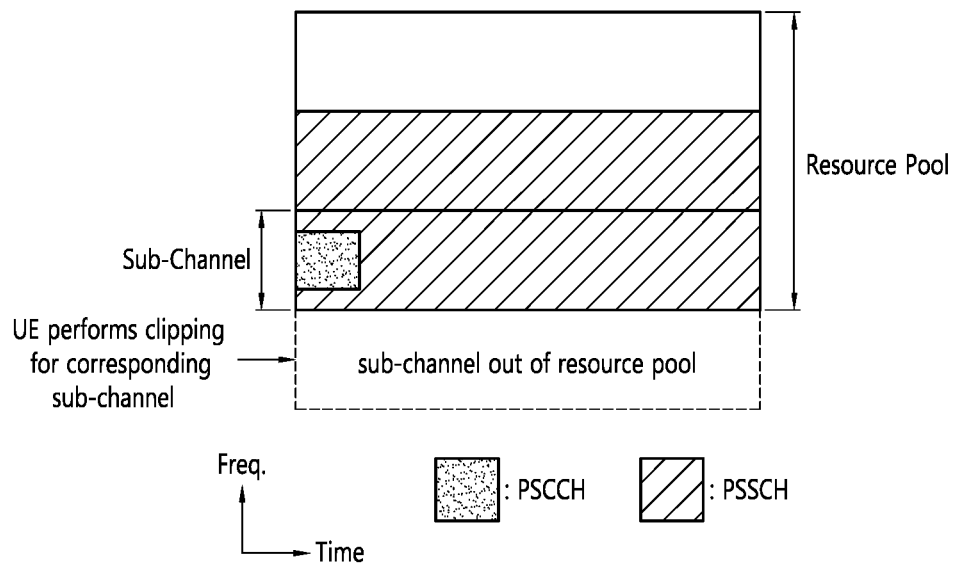
FIG. 31 shows a method for a transmitting UE to perform clipping, based on an embodiment of the present disclosure.

FIG. 31 shows a method for a transmitting UE to perform clipping, based on an embodiment of the present disclosure. The embodiment of FIG. 31 may be combined with various embodiments of the present disclosure.

For example, referring to FIG. 31, it is assumed that a PSSCH is transmitted based on three sub-channels, and a PSCCH is transmitted in the middle sub-channel among the three sub-channels. In addition, it is assumed that three sub-channels are configured as a resource pool. In this case, if a transmitting UE transmits the PSCCH in the first sub-channel of the resource pool, the transmitting UE may not transmit the PSSCH in the first sub-channel out of the resource pool among the three sub-channels. Accordingly, the number of sub-channels transmitted by the transmitting UE to the receiving UE through a SCI may be 3, whereas the number of sub-channels actually allocated may be 2.

Based on an embodiment of the present disclosure, if a PSSCH is allocated in a physical resource block (PRB) or a sub-channel domain, a PSCCH may be transmitted in the middle sub-channel of PSSCH allocation in the PRB. For example, depending on the size of the allocated sub-channel, the PSCCH may be transmitted in ±1 sub-channel. Specifically, for example, as shown in FIG. 29, a subchannel corresponding to the middle of the PSCCH may be located in the middle of the corresponding PSSCH allocation. Alternatively, for example, as shown in FIG. 30, a subchannel corresponding to the start of the PSCCH may be located in the middle of the corresponding PSSCH allocation. In this case, depending on the location of the PSCCH, the number of resource assignments or sub-channels that can be indicated by a SCI may be limited.

Based on an embodiment of the present disclosure, depending on the location in which a PSCCH is transmitted (e.g., a sub-channel to which the start RB of the PSCCH belongs or a sub-channel to which the middle RB of the PSCCH belongs), a PSSCH resource allocation field may be interpreted differently. For example, a transmitting UE may allocate N sub-channels to a receiving UE through a SCI. In this case, according to the transmission location of the PSCCH transmitted by the transmitting UE, M sub-channels may be allocated to the receiving UE. M may be an integer less than or equal to N. For example, if the allocated sub-channel is located outside a resource pool, the transmitting UE may exclude the sub-channel located outside the resource pool from the allocated sub-channel.

Figure 32:
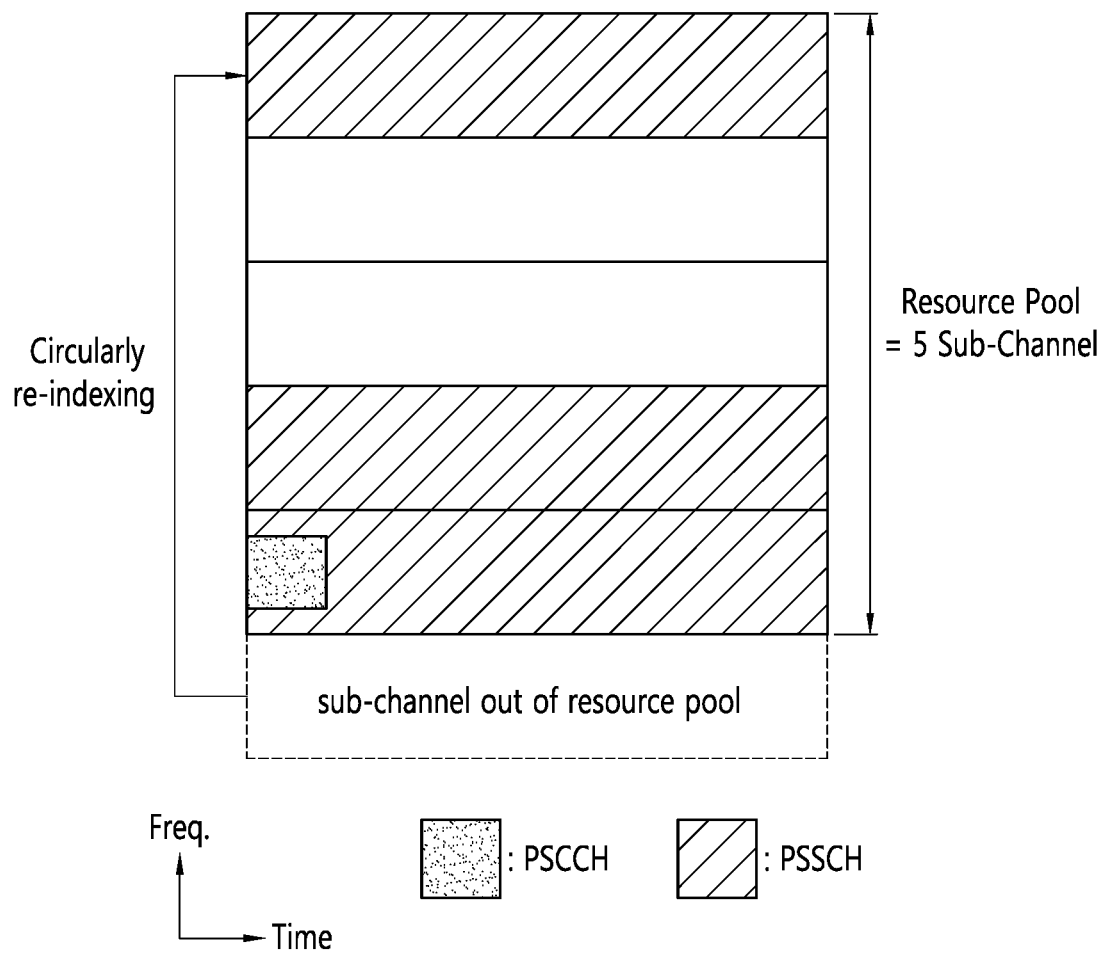
FIGS. 32 and 33 show an example in which allocated PSSCH resource(s) is out of a resource pool, based on an embodiment of the present disclosure.
Figure 33:
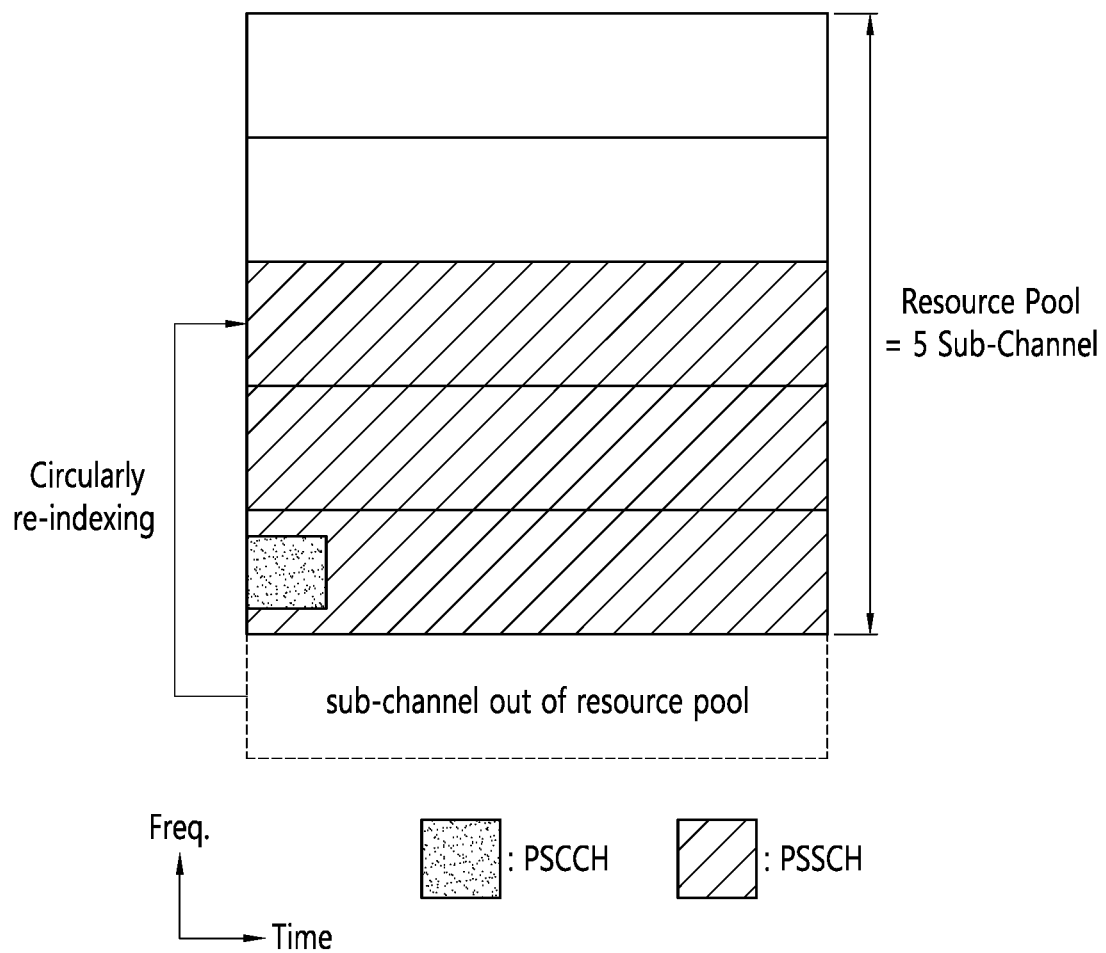

FIGS. 32 and 33 show an example in which allocated PSSCH resource(s) is out of a resource pool, based on an embodiment of the present disclosure. The embodiments of FIGS. 32 and 33 may be combined with various embodiments of the present disclosure.

If allocated PSSCH resource(s) is out of a resource pool, as shown in FIG. 32, a transmitting UE may re-index PSSCH resource(s) circularly, the transmitting UE may re-allocate PSSCH resource(s) out of the resource pool from the opposite sub-channel of the resource pool. In this case, PSSCH resource(s) may be allocated non-contiguously.

Alternatively, if allocated PSSCH resource(s) is out of a resource pool, as shown in FIG. 33, for continuous PSSCH resource allocation, a transmitting UE may re-allocate PSSCH resource(s) out of the resource pool from the sub-channel in the opposite direction.

Referring back to FIG. 24, in step S2420, the transmitting UE may transmit data to the receiving UE based on the PSSCH. The transmission may include unicast, broadcast or groupcast.

Based on an embodiment of the present disclosure, a UE that has determined/allocated PSCCH resource(s) may determine/allocate PSSCH resource(s) based on a pre-defined criterion. Accordingly, the UE receiving the PSCCH may determine the location of the PSSCH resource(s) based on the location of the PSCCH resource(s). Therefore, based on an embodiment of the present disclosure, there may be no need for the transmitting UE to separately transmit information on the PSSCH resource(s) to the receiving UE through a SCI. Accordingly, signaling overhead for the SCI can be reduced.

Figure 34:
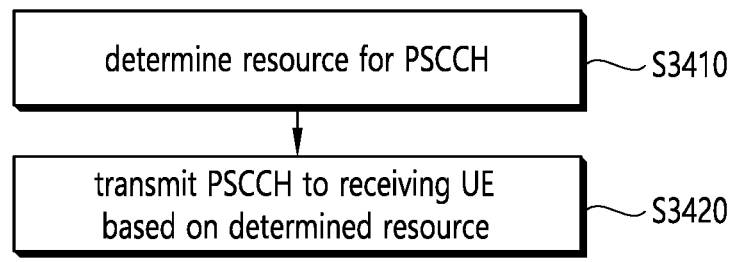
FIG. 34 shows a method for a transmitting UE to transmit a PSCCH, based on an embodiment of the present disclosure.

FIG. 34 shows a method for a transmitting UE to transmit a PSCCH, based on an embodiment of the present disclosure. The embodiment of FIG. 34 may be combined with various embodiments of the present disclosure.

Referring to FIG. 34, in step S3410, a transmitting UE may determine resource(s) for a PSCCH. The resource(s) for the PSCCH may be resource(s) for the transmitting UE to transmit the PSCCH to a receiving UE. The resource(s) for the PSCCH may be configured in one sub-channel. For example, the resource(s) for the PSCCH may be configured by the transmitting UE based on the number of RBs of the sub-channel. For example, the resource(s) for the PSCCH may be configured by a base station. Alternatively, the resource(s) for the PSCCH may be configured across a plurality of sub-channels.

In step S3420, the transmitting UE may transmit the PSCCH to the receiving UE based on the determined resource(s). Additionally, resource(s) for DMRS(s) may be determined in the resource(s) for the PSCCH.

The proposed method can be applied to the apparatus described below. First, the processor (102) of the transmitting UE (100) may determine resource(s) for a PSCCH. In addition, the processor (102) of the transmitting UE (100) may control the transceiver (106) of the transmitting UE (100) to transmit the PSCCH to the receiving UE (200) based on the determined resource(s). Additionally, resource(s) for DMRS(s) may be determined in the resource(s) for the PSCCH.

Figure 35:
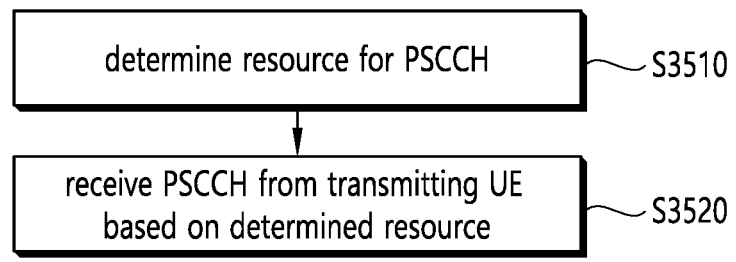
FIG. 35 shows a method for a receiving UE to receive a PSCCH, based on an embodiment of the present disclosure.

FIG. 35 shows a method for a receiving UE to receive a PSCCH, based on an embodiment of the present disclosure. The embodiment of FIG. 35 may be combined with various embodiments of the present disclosure.

Referring to FIG. 35, in step S3510, a receiving UE may determine resource(s) for a PSCCH. The resource(s) for the PSCCH may be resource(s) for the receiving UE to receive the PSCCH from a transmitting UE. The resource(s) for the PSCCH may be configured in one sub-channel. For example, the resource(s) for the PSCCH may be configured by the transmitting UE based on the number of RBs of the sub-channel. In this case, the transmitting UE may inform the receiving UE of the resource(s) for the PSCCH. For example, the resource(s) for the PSCCH may be configured by a base station. Alternatively, the resource(s) for the PSCCH may be configured across a plurality of sub-channels.

In step S3520, the receiving UE may receive the PSCCH from the transmitting UE based on the determined resource(s).

The proposed method can be applied to the apparatus described below. First, the processor (202) of the receiving UE (200) may determine resource(s) for a PSCCH. In addition, the processor (202) of the receiving UE (200) may control the transceiver (206) of the receiving UE (200) to receive the PSCCH from the transmitting UE (100) based on the determined resource(s).

Figure 36:
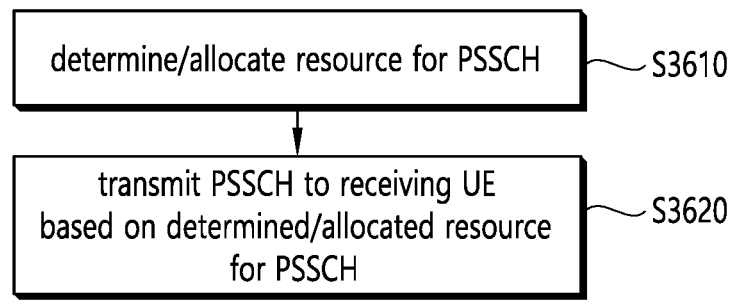
FIG. 36 shows a method for a transmitting UE to transmit a PSSCH, based on an embodiment of the present disclosure.

FIG. 36 shows a method for a transmitting UE to transmit a PSSCH, based on an embodiment of the present disclosure. The embodiment of FIG. 36 may be combined with various embodiments of the present disclosure.

Referring to FIG. 36, in step S3610, a transmitting UE may determine/allocate resource(s) for a PSSCH. In step S3620, the transmitting UE may transmit the PSSCH to a receiving UE based on the determined/allocated resource(s) for the PSSCH.

The proposed method can be applied to the apparatus described below. First, the processor (102) of the transmitting UE (100) may determine/allocate resource(s) for a PSSCH. In addition, the processor (102) of the transmitting UE (100) may control the transceiver (106) of the transmitting UE (100) to transmit the PSSCH to the receiving UE (200) based on the determined/allocated resource(s) for the PSSCH.

Figure 37:
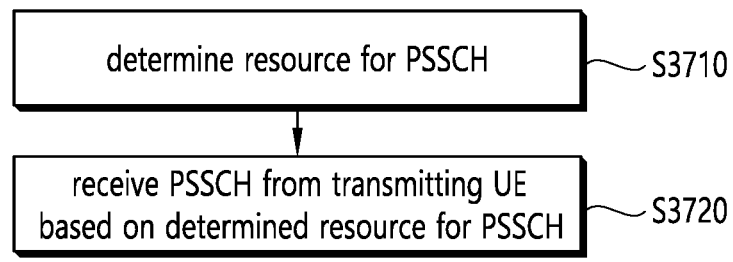
FIG. 37 shows a method for a receiving UE to receive a PSSCH, based on an embodiment of the present disclosure.

FIG. 37 shows a method for a receiving UE to receive a PSSCH, based on an embodiment of the present disclosure. The embodiment of FIG. 37 may be combined with various embodiments of the present disclosure.

Referring to FIG. 37, in step S3710, a receiving UE may determine resource(s) for a PSSCH. In step S3720, the receiving UE may receive the PSSCH from a transmitting UE based on the determined resource(s) for the PSSCH.

The proposed method can be applied to the apparatus described below. First, the processor (202) of the receiving UE (200) may determine resource(s) for a PSSCH. In addition, the processor (202) of the receiving UE (200) may control the transceiver (206) of the receiving UE (200) to receive the PSSCH from the transmitting UE (100) based on the determined resource(s) for the PSSCH.

Figure 38:
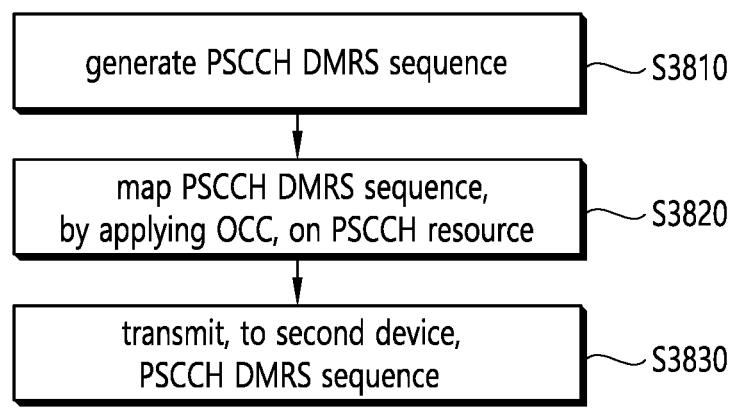
FIG. 38 shows a method for a first device to perform wireless communication, based on an embodiment of the present disclosure.

FIG. 38 shows a method for a first device to perform wireless communication, based on an embodiment of the present disclosure. The embodiment of FIG. 38 may be combined with various embodiments of the present disclosure.

Referring to FIG. 38, in step S3810, a first device may generate a physical sidelink control channel (PSCCH) demodulation reference signal (DMRS) sequence. For example, the PSCCH DMRS sequence may be generated based on a pseudo random sequence.

In step S3820, the first device may map the PSCCH DMRS sequence, by applying an orthogonal cover code (OCC), on a PSCCH resource.

For example, the PSCCH DMRS sequence may be mapped on a plurality of resource elements on the PSCCH resource in a unit of a symbol. For example, the PSCCH DMRS sequence may be mapped on one or more symbols on the PSCCH resource.

For example, the OCC may be applied to the PSCCH DMRS sequence mapped on a plurality of resource elements in one symbol. For example, the OCC may be applied to the PSCCH DMRS sequence in a unit of a symbol. For example, a length of the OCC may be 2, 3 or 4. For example, the PSCCH DMRS sequence may be mapped on a second subcarrier, a sixth subcarrier, and a tenth subcarrier in one resource block (RB), and the one RB may include 12 subcarriers.

For example, the PSCCH DMRS sequence may be not mapped on a symbol related to an AGC on the PSCCH resource. For example, the PSCCH DMRS sequence may be mapped on N/2-th symbol among remaining N symbols related to a PSCCH except for the symbol related to the ACG, and N may be an even number. For example, the PSCCH DMRS sequence may be mapped on (N+1)/2-th symbol among remaining N symbols related to a PSCCH except for the symbol related to the ACG, and N may be odd number.

In step S3830, the first device may transmit, to a second device, the PSCCH DMRS sequence.

Additionally, the first device may apply a cyclic shift (CS) to the PSCCH DMRS sequence. For example, the CS may be applied to the PSCCH DMRS sequence mapped on a plurality of resource elements in one symbol.

The proposed method can be applied to the apparatus described below. First, the processor (102) of the first device (100) may generate a physical sidelink control channel (PSCCH) demodulation reference signal (DMRS) sequence. In addition, the processor (102) of the first device (100) may map the PSCCH DMRS sequence, by applying an orthogonal cover code (OCC), on a PSCCH resource. In addition, the processor (102) of the first device (100) may control the transceiver (106) to transmit, to a second device (200), the PSCCH DMRS sequence.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: generate a physical sidelink control channel (PSCCH) demodulation reference signal (DMRS) sequence; map the PSCCH DMRS sequence, by applying an orthogonal cover code (OCC), on a PSCCH resource; and transmit, to a second device, the PSCCH DMRS sequence.

Based on an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: generate a physical sidelink control channel (PSCCH) demodulation reference signal (DMRS) sequence; map the PSCCH DMRS sequence, by applying an orthogonal cover code (OCC), on a PSCCH resource; and transmit, to a second UE, the PSCCH DMRS sequence.

Based on an embodiment of the present disclosure, a non-transitory computer-readable storage medium storing instructions may be provided. For example, the instructions, when executed, may cause a first device to: generate a physical sidelink control channel (PSCCH) demodulation reference signal (DMRS) sequence; map the PSCCH DMRS sequence, by applying an orthogonal cover code (OCC), on a PSCCH resource; and transmit, to a second device, the PSCCH DMRS sequence.

FIG. 39 shows a method for a second device to perform wireless communication, based on an embodiment of the present disclosure. The embodiment of FIG. 39 may be combined with various embodiments of the present disclosure.

Referring to FIG. 39, in step S3910, a second device may receive, from a first device, a physical sidelink control channel (PSCCH) demodulation reference signal (DMRS) sequence. For example, the PSCCH DMRS sequence may be generated by the first device based on a pseudo random sequence. For example, the PSCCH DMRS sequence may be mapped by the first device on a PSCCH resource based on an orthogonal cover code (OCC). For example, the PSCCH DMRS sequence may be mapped on a plurality of resource elements on the PSCCH resource in a unit of a symbol. For example, the OCC may be applied to the PSCCH DMRS sequence in a unit of a symbol.

The proposed method can be applied to the apparatus described below. First, the processor (202) of the second device (200) may control the transceiver (206) to receive, from the first device (100), a physical sidelink control channel (PSCCH) demodulation reference signal (DMRS) sequence.

Based on an embodiment of the present disclosure, a second device configured to perform wireless communication may be provided. For example, the second device may comprise: one or more memories storing instructions; one or more transceivers; and one or more processors connected to the one or more memories and the one or more transceivers.

For example, the one or more processors may execute the instructions to: receive, from a first device, a physical sidelink control channel (PSCCH) demodulation reference signal (DMRS) sequence. Herein, for example, the PSCCH DMRS sequence may be generated by the first device based on a pseudo random sequence, and the PSCCH DMRS sequence may be mapped by the first device on a PSCCH resource based on an orthogonal cover code (OCC).

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 40:
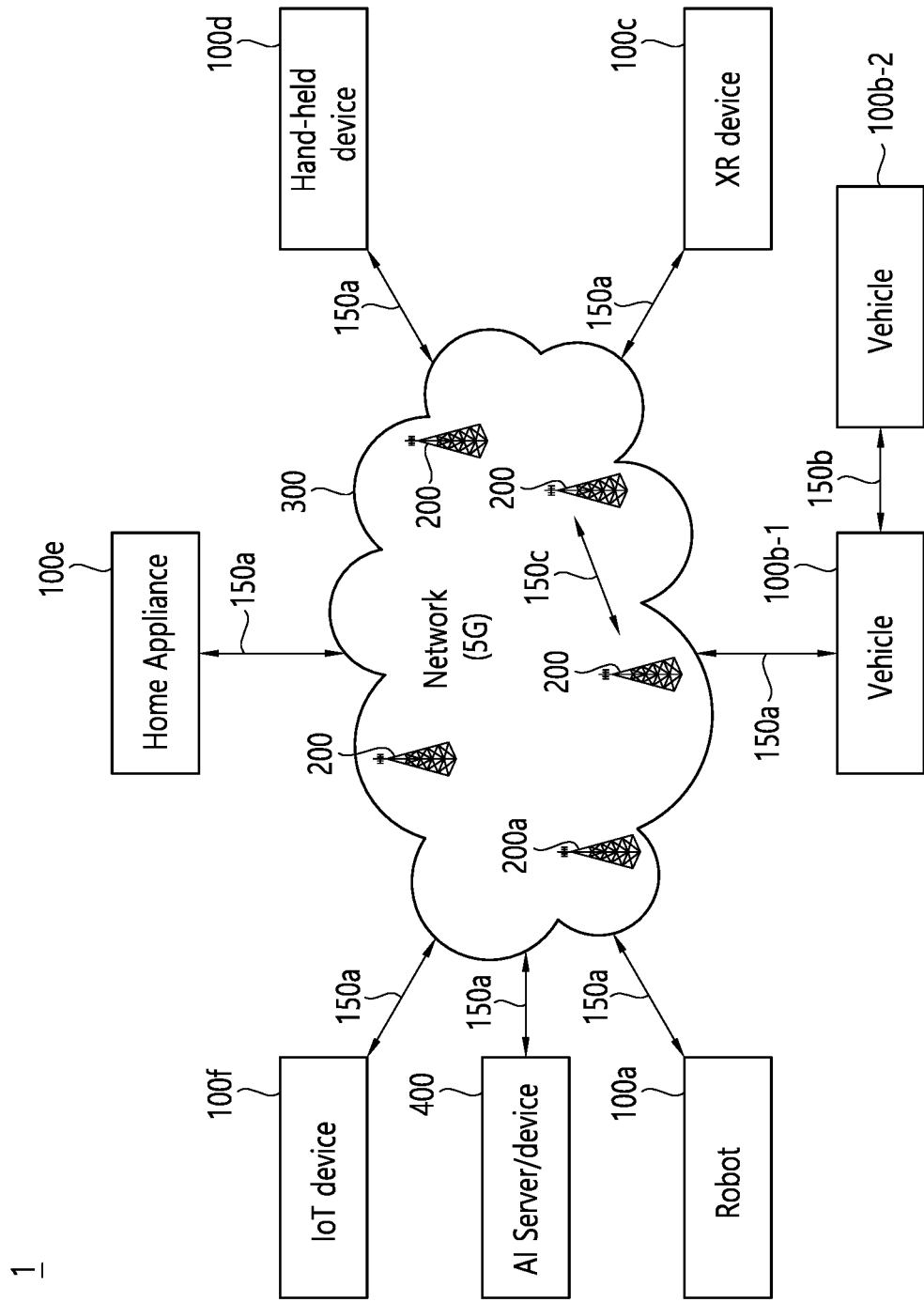
FIG. 40 shows a communication system 1, based on an embodiment of the present disclosure.

FIG. 40 shows a communication system 1, based on an embodiment of the present disclosure.

Referring to FIG. 40, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 41:
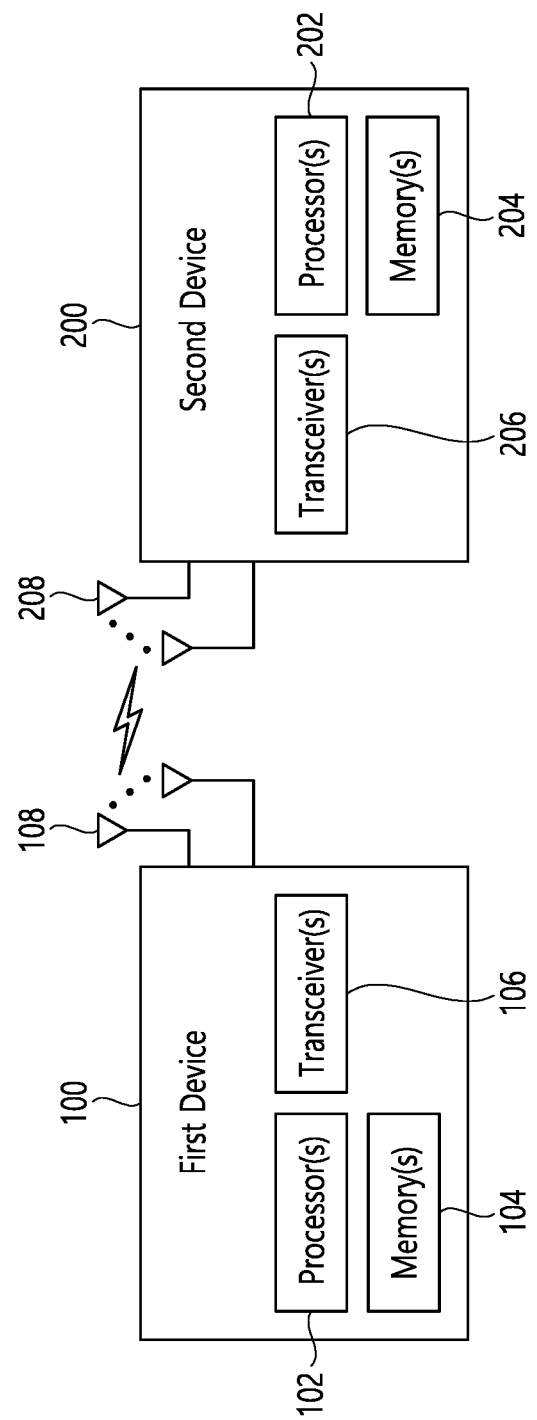
FIG. 41 shows wireless devices, based on an embodiment of the present disclosure.

FIG. 41 shows wireless devices, based on an embodiment of the present disclosure.

Referring to FIG. 41, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 40.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 42:
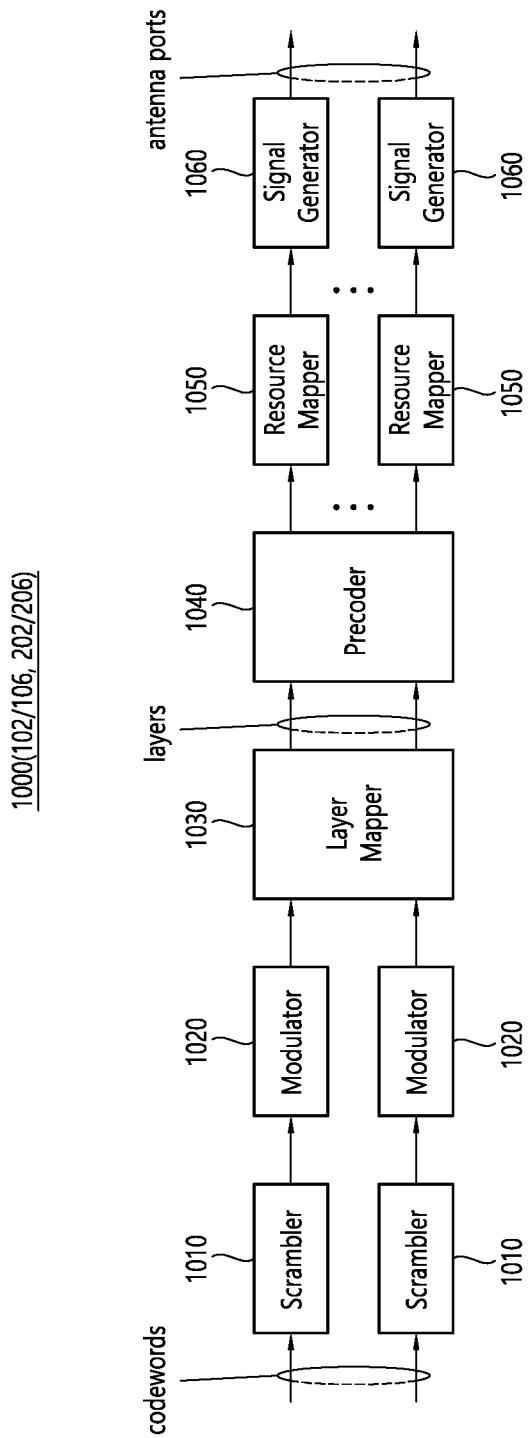
FIG. 42 shows a signal process circuit for a transmission signal, based on an embodiment of the present disclosure.

FIG. 42 shows a signal process circuit for a transmission signal, based on an embodiment of the present disclosure.

Referring to FIG. 42, a signal processing circuit 1000 may include scramblers 1010, modulators 1020, a layer mapper 1030, a precoder 1040, resource mappers 1050, and signal generators 1060. An operation/function of FIG. 42 may be performed, without being limited to, the processors 102 and 202 and/or the transceivers 106 and 206 of FIG. 41. Hardware elements of FIG. 42 may be implemented by the processors 102 and 202 and/or the transceivers 106 and 206 of FIG. 41. For example, blocks 1010 to 1060 may be implemented by the processors 102 and 202 of FIG. 41. Alternatively, the blocks 1010 to 1050 may be implemented by the processors 102 and 202 of FIG. 41 and the block 1060 may be implemented by the transceivers 106 and 206 of FIG. 41.

Codewords may be converted into radio signals via the signal processing circuit 1000 of FIG. 42. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 42. For example, the wireless devices (e.g., 100 and 200 of FIG. 41) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 43:
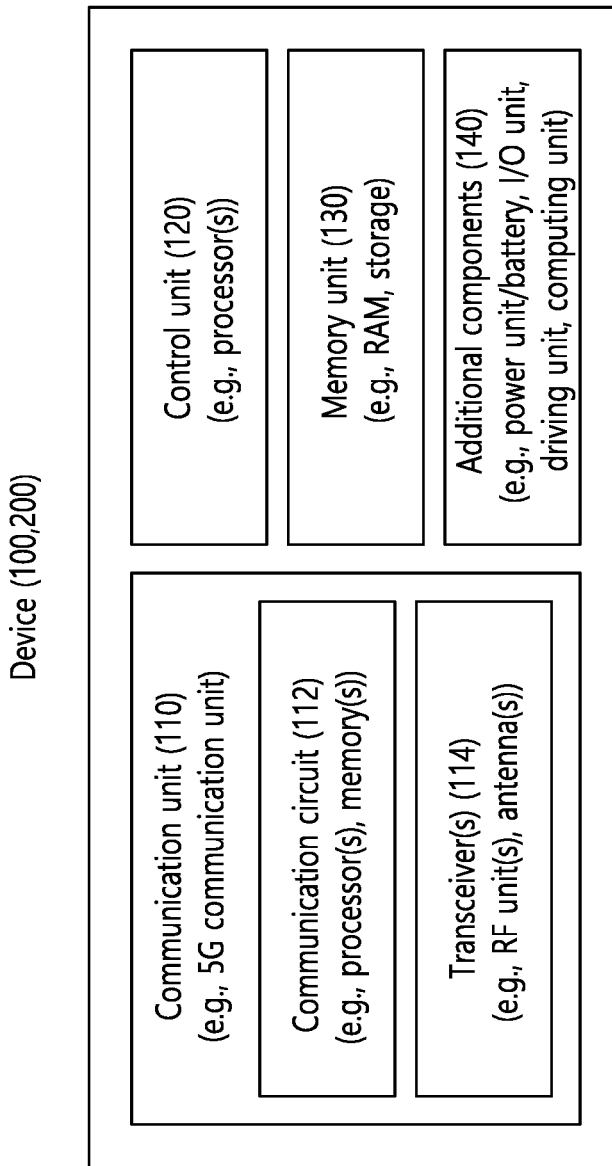
FIG. 43 shows another example of a wireless device, based on an embodiment of the present disclosure.

FIG. 43 shows another example of a wireless device, based on an embodiment of the present disclosure. The wireless device may be implemented in various forms according to a use-case/service (refer to FIG. 40).

Referring to FIG. 43, wireless devices 100 and 200 may correspond to the wireless devices 100 and 200 of FIG. 41 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 41. For example, the transceiver(s) 114 may include the one or more transceivers 106 and 206 and/or the one or more antennas 108 and 208 of FIG. 41. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 40), the vehicles (100b-1 and 100b-2 of FIG. 40), the XR device (100c of FIG. 40), the hand-held device (100d of FIG. 40), the home appliance (100e of FIG. 40), the IoT device (100f of FIG. 40), a digital broadcast terminal, a hologram device, a public safety device, an MTC device, a medicine device, a fintech device (or a finance device), a security device, a climate/environment device, the AI server/device (400 of FIG. 40), the BSs (200 of FIG. 40), a network node, etc. The wireless device may be used in a mobile or fixed place according to a use-example/service.

In FIG. 43, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 43 will be described in detail with reference to the drawings.

Figure 44:
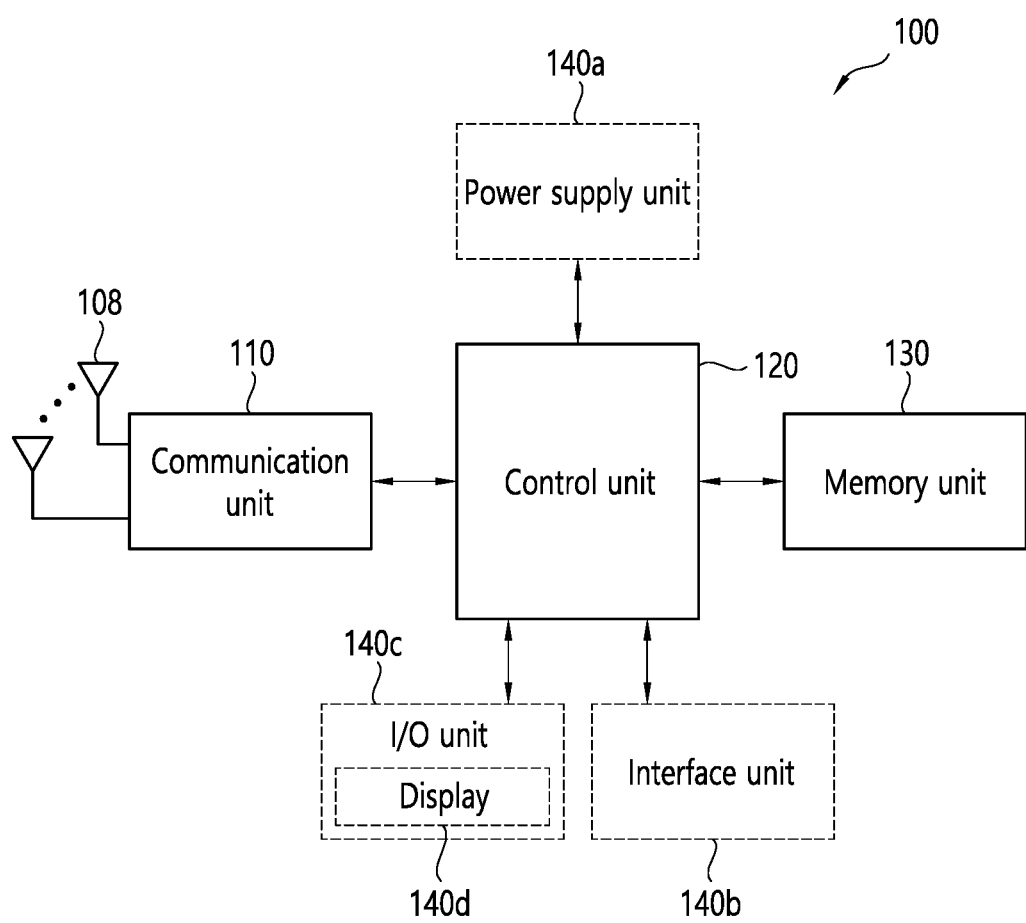
FIG. 44 shows a hand-held device, based on an embodiment of the present disclosure.

FIG. 44 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 44, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 43, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 45:
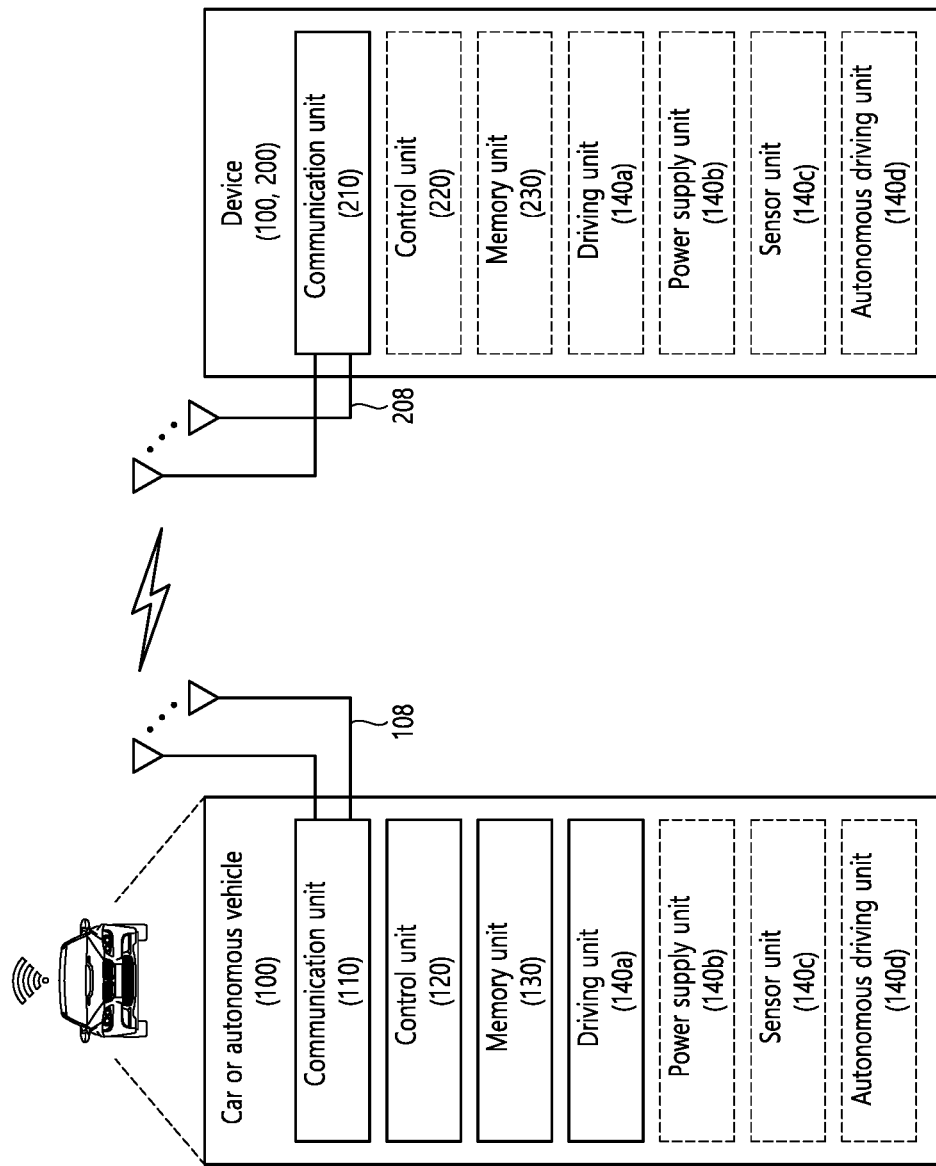
FIG. 45 shows a vehicle or an autonomous vehicle, based on an embodiment of the present disclosure.

FIG. 45 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 45, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 43, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
    generating a physical sidelink control channel (PSCCH) demodulation reference signal (DMRS) sequence;
    mapping the PSCCH DMRS sequence to a PSCCH resource; and
    transmitting, to a second device, the PSCCH DMRS sequence,
    wherein the PSCCH DMRS sequence is mapped to the PSCCH resource by applying an orthogonal cover code (OCC), having a length of 3, only to a second subcarrier, a sixth subcarrier, and a tenth subcarrier within a resource block (RB),
    wherein the RB includes 12 subcarriers.

2. The method of claim 1, wherein the PSCCH DMRS sequence is generated based on a pseudo random sequence.

3. The method of claim 1, wherein the PSCCH DMRS sequence is mapped to the PSCCH resource per a symbol.

4. The method of claim 1, wherein the PSCCH DMRS sequence is mapped to one or more symbols on the PSCCH resource.

5. The method of claim 1, wherein the OCC is randomly selected by the first device among a plurality of OCCs.

6. The method of claim 1, wherein the OCC is applied to the PSCCH DMRS sequence per a symbol.

7. The method of claim 1, wherein the PSCCH DMRS sequence is not mapped to a symbol related to an automatic gain control (AGC) on the PSCCH resource.

8. The method of claim 7, wherein the PSCCH DMRS sequence is mapped to N/2-th symbol among remaining N symbols related to a PSCCH except for the symbol related to the ACG, and
    wherein N is an even number.

9. The method of claim 7, wherein the PSCCH DMRS sequence is mapped to (N+1)/2-th symbol among remaining N symbols related to a PSCCH except for the symbol related to the ACG, and
    wherein N is odd number.

10. The method of claim 1, further comprising:
    applying a cyclic shift (CS) to the PSCCH DMRS sequence.

11. The method of claim 10, wherein the CS is applied to the PSCCH DMRS sequence mapped to a plurality of resource elements in a symbol.

12. A first device adapted to perform wireless communication, the first device comprising:
    at least one transceiver;
    at least one processor; and
    at least one memory connected to the at least one processor and storing instructions that, based on being executed, cause the first device to perform operations comprising:
    generating a physical sidelink control channel (PSCCH) demodulation reference signal (DMRS) sequence;
    mapping the PSCCH DMRS sequence to a PSCCH resource; and
    transmitting, to a second device, the PSCCH DMRS sequence,
    wherein the PSCCH DMRS sequence is mapped to the PSCCH resource by applying an orthogonal cover code (OCC), having a length of 3, only to a second subcarrier, a sixth subcarrier, and a tenth subcarrier within a resource block (RB),
    wherein the RB includes 12 subcarriers.

13. The first device of claim 12, wherein the PSCCH DMRS sequence is mapped to the PSCCH resource per a symbol.

14. The first device of claim 12, wherein the OCC is randomly selected by the first device among a plurality of OCCs.

15. The first device of claim 12, wherein the OCC is applied to the PSCCH DMRS sequence per a symbol.

16. A processing device adapted to control a first device, the processing device comprising:
    at least one processor; and
    at least one memory connected to the at least one processor and storing instructions that, based on being executed, cause the first device to perform operations comprising:
    generating a physical sidelink control channel (PSCCH) demodulation reference signal (DMRS) sequence;
    mapping the PSCCH DMRS sequence to a PSCCH resource; and
    transmitting, to a second device, the PSCCH DMRS sequence,
    wherein the PSCCH DMRS sequence is mapped to the PSCCH resource by applying an orthogonal cover code (OCC), having a length of 3, only to a second subcarrier, a sixth subcarrier, and a tenth subcarrier within a resource block (RB),
    wherein the RB includes 12 subcarriers.

17. The processing device of claim 16, wherein the PSCCH DMRS sequence is mapped to the PSCCH resource per a symbol.

18. The processing device of claim 16, wherein the OCC is randomly selected by the first device among a plurality of OCCs.

19. The processing device of claim 16, wherein the OCC is applied to the PSCCH DMRS sequence per a symbol.

* * * * *